US011818973B1

(12) United States Patent
Sedmak et al.

(10) Patent No.: US 11,818,973 B1
(45) Date of Patent: Nov. 21, 2023

(54) GARDEN TILLER UTILIZING AN IMPACT MOTOR

(71) Applicant: Daniel D. Sedmak, Worthington, OH (US)

(72) Inventors: Daniel D. Sedmak, Worthington, OH (US); Christopher L. Brandon, Dublin, OH (US); George N. Catlin, Grove City, OH (US); Bradley S. Cline, London, OH (US); Michael J. Krull, Hilliard, OH (US); Matthew D. Schrader, Baltimore, OH (US)

(73) Assignee: Daniel D. Sedmak, Worthington, OH (US)

( * ) Notice: Subject to any disclaimer, the term of this patent is extended or adjusted under 35 U.S.C. 154(b) by 181 days.

(21) Appl. No.: 17/319,045

(22) Filed: May 12, 2021

Related U.S. Application Data

(60) Provisional application No. 63/023,457, filed on May 12, 2020.

(51) Int. Cl.
*A01B 33/02* (2006.01)
*A01B 33/08* (2006.01)
(Continued)

(52) U.S. Cl.
CPC .......... *A01B 33/027* (2013.01); *A01B 33/021* (2013.01); *A01B 33/028* (2013.01);
(Continued)

(58) Field of Classification Search
CPC ..... A01B 33/027; A01B 9/003; A01B 33/028; A01B 33/103; A01B 1/065; A01B 33/021; A01B 33/142; A01B 33/087
See application file for complete search history.

(56) References Cited

U.S. PATENT DOCUMENTS 1,801,017 A 4/1931 Major
1,827,074 A 10/1931 Ditlevsen
(Continued)

FOREIGN PATENT DOCUMENTS

CA 2775336 A1 * 2/2013 .......... A01B 33/028
GB 2333938 A * 8/1999 .......... A01B 33/027

OTHER PUBLICATIONS

"Craftsman 9-11818 Nextec 12-volt Lithium-Ion Hammerhead Auto Hammer", Amazon Website, Web page <https://www.amazon.com/Craftsman-9-11818-12-volt-Lithium-Ion-Hammerhead/dp/B0040ZLPGY>, 8 pages, dated at least as early as Jun. 28, 2017, retrieved from amazon.com website on Jul. 30, 2021.

(Continued)

*Primary Examiner* — Adam J Behrens
*Assistant Examiner* — Blake E Scoville
(74) *Attorney, Agent, or Firm* — The Law Office of Patrick F. O'Reilly III, LLC

(57) ABSTRACT

A garden tiller is disclosed herein. The garden tiller includes at least one handle portion configured to be grasped by a user; a shaft portion coupled to the at least one handle portion, the shaft portion having a first end and a second end, the second end of the shaft portion being oppositely disposed relative to the first end; and a body portion coupled to the second end of the shaft portion, the body portion including an impact motor configured to drive one or more cultivating teeth for loosening and/or displacing soil, the impact motor configured to apply an impact torque to the one or more cultivating teeth so as to more effectively break up compacted soil.

18 Claims, 24 Drawing Sheets

(51) Int. Cl.
*A01B 33/10* (2006.01)
*A01B 33/14* (2006.01)

(52) U.S. Cl.
CPC .......... *A01B 33/087* (2013.01); *A01B 33/103* (2013.01); *A01B 33/142* (2013.01)

(56) References Cited

U.S. PATENT DOCUMENTS

| | | | |
|---|---|---|---|
| 2,126,829 A | 8/1938 | Snodgrass | |
| 2,550,522 A | 4/1951 | Bolongaro | |
| 2,553,463 A | 5/1951 | McCulloch | |
| 2,816,495 A | 12/1957 | Brooks | |
| 2,926,736 A | 3/1960 | Lee, Jr. | |
| 3,057,412 A | 10/1962 | Hovis, Jr. | |
| 3,126,968 A | 3/1964 | Booth | |
| 3,229,589 A | 1/1966 | Langas | |
| 3,756,324 A | 9/1973 | Bills | |
| 4,003,603 A | 1/1977 | Stemler et al. | |
| 4,014,392 A | 3/1977 | Ross | |
| 4,122,902 A | 10/1978 | Alexander | |
| 4,229,046 A | 10/1980 | Gurries | |
| 4,305,470 A | 12/1981 | Anderson | |
| 4,353,422 A | 10/1982 | Bennett, Jr. | |
| 4,379,595 A | 4/1983 | Roussin et al. | |
| 4,609,053 A | 9/1986 | Ragnmark | |
| 4,776,408 A | 10/1988 | Elkin et al. | |
| 4,906,049 A | 3/1990 | Anderson | |
| 5,072,993 A | 12/1991 | Dickerson | |
| 5,094,017 A | 3/1992 | Matsumoto et al. | |
| 5,520,253 A * | 5/1996 | Kesting .................. | A01B 51/02 74/355 |
| 5,697,453 A | 12/1997 | Van Den Bosch | |
| 5,730,225 A | 3/1998 | Fults | |
| 5,833,009 A | 11/1998 | Rebot | |
| 6,092,608 A * | 7/2000 | Leger ..................... | A01G 3/062 172/15 |
| 6,517,164 B1 | 2/2003 | White | |
| 7,107,691 B2 | 9/2006 | Nottingham et al. | |
| 7,131,677 B2 | 11/2006 | Ota | |
| 8,579,040 B2 | 11/2013 | Sedmak | |
| 8,651,196 B2 | 2/2014 | Sedmak | |
| 2005/0274532 A1* | 12/2005 | Lephart ................. | A01B 1/065 172/410 |
| 2007/0193754 A1 | 8/2007 | Beckman et al. | |
| 2008/0236851 A1* | 10/2008 | Winkle .................. | A01B 35/28 172/548 |
| 2010/0051299 A1* | 3/2010 | Marcil .................. | A01B 33/028 172/74 |
| 2010/0139936 A1* | 6/2010 | Notaras ................ | A01B 33/028 172/1 |
| 2010/0288520 A1 | 11/2010 | Dayton et al. | |
| 2016/0309640 A1* | 10/2016 | Marken .................. | A01B 1/065 |

OTHER PUBLICATIONS

"Rockwell RK5101K SoniCrafter 37-Piece Oscillating Tool Kit", Amazon Website, Web page <https://www.amazon.com/dp/B001EYUGMI>, 8 pages, dated at least as early as Sep. 14, 2004, retrieved from amazon.com website on Jul. 30, 2021.

"Craftsman 17438 Nextec 12-volt Lithium-Ion Cordless Multi-Tool", Shop Your Way Website, Web page <https://www.shopyourway.com/search/products/?q=craftsman%20917438%20nextec12v%20lithium%20ion%20multi%20tool>, 1 page, dated at least as early as Jan. 1, 2000, retrieved from shopyourway.com website on Jul. 30, 2021.

* cited by examiner

Section A-A

Detail "A"

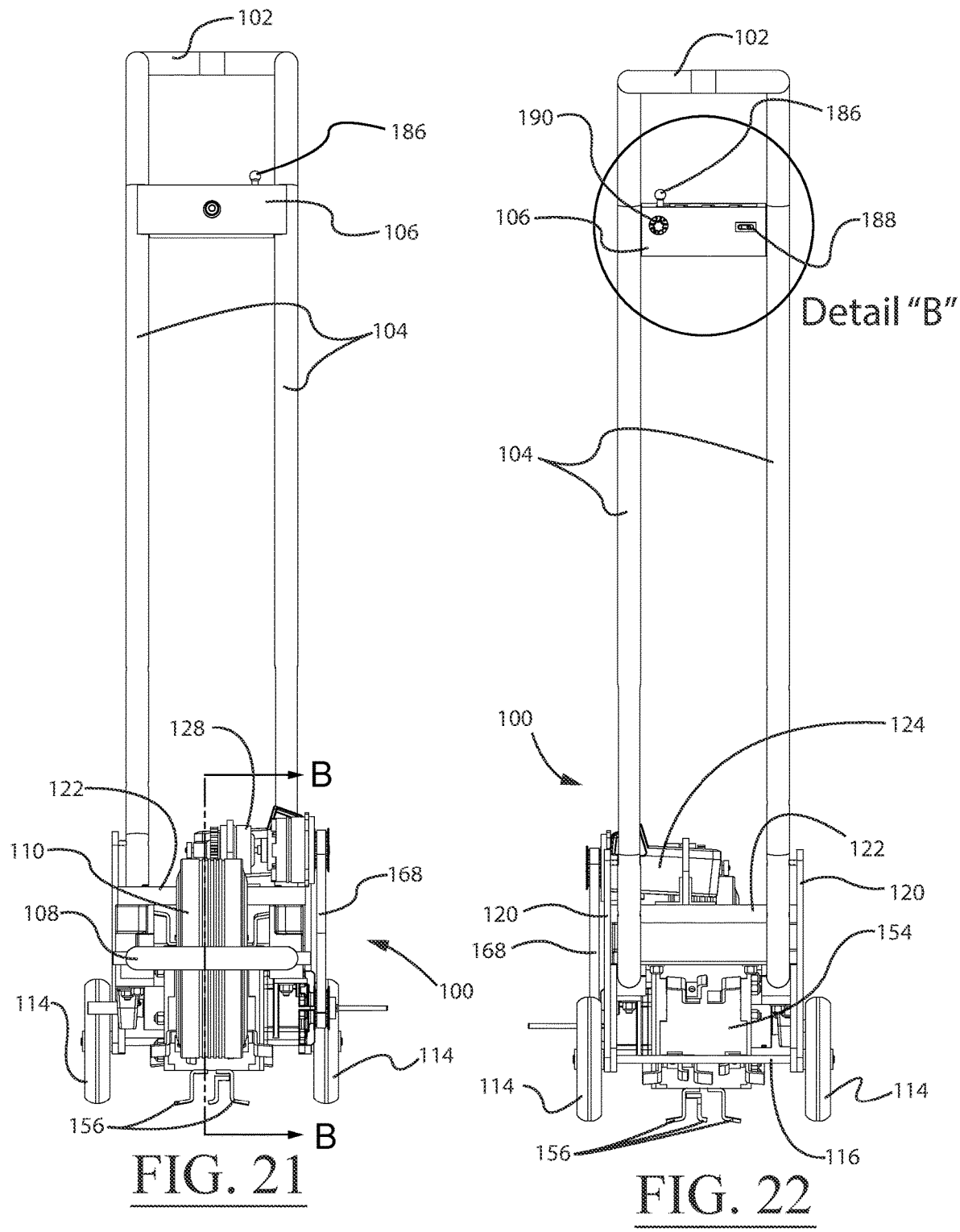

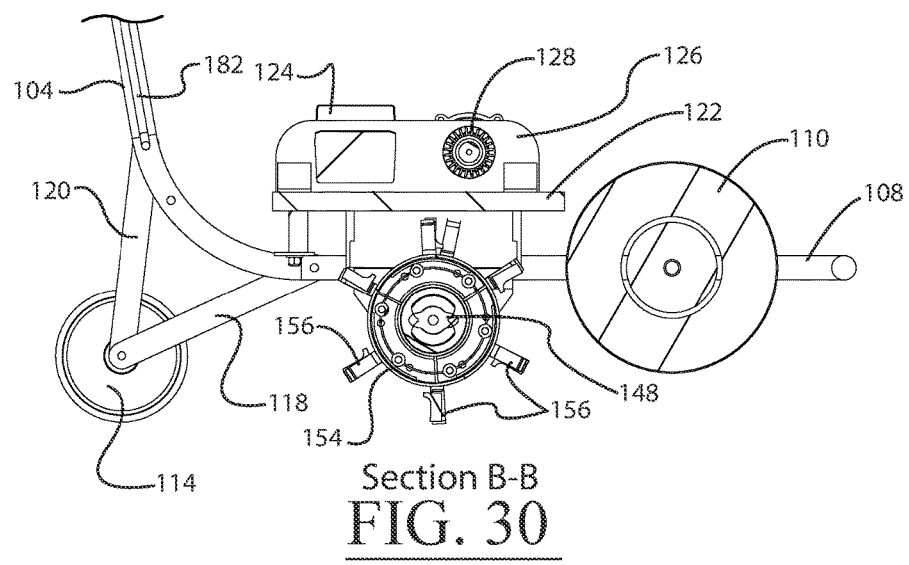
Section B-B
FIG. 30
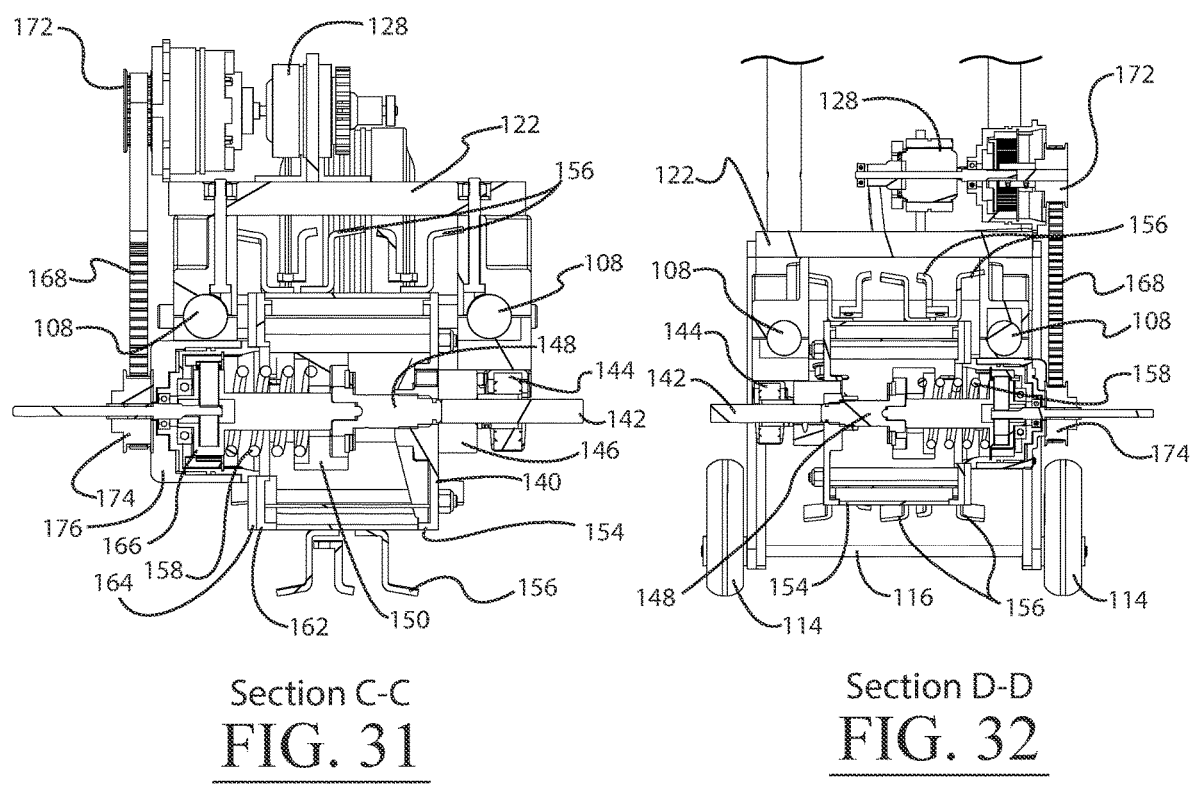
Section C-C
FIG. 31
Section D-D
FIG. 32

Detail "B"

GARDEN TILLER UTILIZING AN IMPACT MOTOR

CROSS-REFERENCE TO RELATED APPLICATIONS

This patent application claims priority to, and incorporates by reference in its entirety, U.S. Provisional Patent Application No. 63/023,457, entitled "Handheld Garden Tiller", filed on May 12, 2020.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to a garden tiller. More particularly, the invention relates to a garden tiller that is configured to apply an impact torque to one or more cultivating teeth so as to more effectively break up compacted soil.

2. Background

While conventional tools exist that assist a gardener in cultivating land, these conventional tools require the gardener to exert a significant amount of physical strength to perform many of the cultivating tasks. As an example, a garden hoe may be used to manually break up soil. While the garden hoe may be designed for performing this task, when the soil is packed and/or dry, the garden hoe may be difficult to operate. As such, the desired results may be difficult to achieve because the gardener may tire before the cultivation is complete. Additionally, a gardener with diminished strength and/or endurance may have difficulty operating such conventional tools.

Therefore, what is needed is a garden tiller that is able to effectively cultivate both normal and heavily compacted, clay-rich soils. Moreover, a garden tiller is needed that minimizes the frictional drag of cutting through the soil, while still moving soil back and up and out of the area of active digging. Furthermore, there is a need for a garden tiller that is lightweight enough to be effectively used by the home gardener, particularly a home gardener with diminished strength and/or endurance.

BRIEF SUMMARY OF EMBODIMENTS OF THE INVENTION

Accordingly, the present invention is directed to a garden tiller that substantially obviates one or more problems resulting from the limitations and deficiencies of the related art.

In accordance with one or more embodiments of the present invention, there is provided a garden tiller that includes at least one handle portion configured to be grasped by a user; a shaft portion coupled to the at least one handle portion, the shaft portion having a first end and a second end, the second end of the shaft portion being oppositely disposed relative to the first end; and a body portion coupled to the second end of the shaft portion, the body portion including an impact motor configured to drive one or more cultivating teeth for loosening and/or displacing soil, the impact motor configured to apply an impact torque to the one or more cultivating teeth so as to more effectively break up compacted soil.

In a further embodiment of the present invention, the at least one handle portion comprises an upper handle portion attached to the first end of the shaft portion, and a lower handle portion attached to the shaft portion between the first and second ends of the shaft portion.

In yet a further embodiment, the shaft portion comprises a telescopic inner shaft disposed within an external outer shaft so that a length of the shaft portion is able to be adjusted.

In still a further embodiment, the impact motor is in the form of an electric motor, and wherein the garden tiller further comprises a battery power source for powering the electric motor.

In yet a further embodiment, the body portion further comprises a shield member for preventing the loosened soil from being thrown backwards toward the user.

In still a further embodiment, the body portion further comprises a trough device adjustably attached to the shield member, the trough device adjustable to different heights for creating trenches of varying depths in the soil.

In yet a further embodiment, the body portion further comprises an inner cylinder member and an outer cylinder member, the impact motor being disposed in the inner cylinder member, the one or more cultivating teeth being attached to the outer cylinder member, and the outer cylinder member being configured to rotate relative to the inner cylinder member when the one or more cultivating teeth are being driven by the impact motor.

In still a further embodiment, the one or more cultivating teeth of the body portion comprise a plurality of teeth disposed on at least one ring member attached to the outer cylinder member, the plurality of teeth being circumferentially spaced apart about the at least one ring member.

In yet a further embodiment, the at least one ring member comprises a plurality of ring members axially spaced apart from one another along a length of the outer cylinder member, each of the plurality of ring members having a plurality of circumferentially spaced-apart teeth, and at least some of the teeth on adjacent ring members being circumferentially staggered relative to one another so as to contact the soil at varying heights.

In still a further embodiment, wherein at least one of the one or more cultivating teeth has a tapered body portion with a sharp tip to facilitate the breaking up of the compacted soil.

In yet a further embodiment, the one or more cultivating teeth of the body portion comprise a plurality of cultivating teeth for loosening and/or displacing soil, and wherein the impact motor is configured to apply a baseline torque and an additional impact torque to the plurality of cultivating teeth so as to more effectively break up compacted soil.

In still a further embodiment, the body portion further comprises a plurality of wheels for enabling the garden tiller to be rolled along the ground.

In yet a further embodiment, the garden tiller further comprises a height adjustment mechanism, the height adjustment mechanism enabling the garden tiller to be adjustable to different heights for varying a soil cultivating depth.

In still a further embodiment, the impact motor comprises an electric motor remotely located from an impact hammer and anvil, the impact hammer and anvil being operatively to a rotatable cylinder member, and the one or more cultivating teeth being attached to the rotatable cylinder member such that a rotation of the rotatable cylinder member is imparted to the one or more cultivating teeth.

In yet a further embodiment, the garden tiller further comprises a first pulley or first sprocket operatively coupled to the electric motor and a second pulley or second sprocket operatively coupled to the impact hammer, the first pulley or first sprocket being operatively coupled to the second pulley or second sprocket by means of a tangential coupling element.

In still a further embodiment, the tangential coupling element is selected from the group consisting of a belt and a chain.

In yet a further embodiment, the one or more cultivating teeth of the body portion comprise a plurality of rows of teeth circumferentially spaced apart about a circumference of the rotatable cylinder member, and at least two of the plurality of rows of teeth have different quantities of teeth so as to create a staggered arrangement of teeth.

In still a further embodiment, at least one tooth in the plurality of rows of teeth is directed inwardly toward a longitudinal centerline of the body portion, and at least another tooth in the plurality of rows of teeth is directed outwardly away from the longitudinal centerline of the body portion.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which:

FIG. 21 is a front view of the garden tiller of FIG. 20;

FIG. 22 is a rear view of the garden tiller of FIG. 20;

FIG. 30 is a longitudinal sectional view cut through the body portion of the garden tiller of FIG. 20, wherein the section is generally cut along the cutting-plane line B-B in FIG. 21;

FIG. 31 is a transverse sectional view cut through the body portion of the garden tiller of FIG. 20, wherein the section is generally cut along the cutting-plane line C-C in FIG. 24;

FIG. 32 is a transverse sectional view cut through the body portion of the garden tiller of FIG. 20, wherein the section is generally cut along the cutting-plane line D-D in FIG. 23;

Throughout the figures, the same parts are always denoted using the same reference characters so that, as a general rule, they will only be described once.

DETAILED DESCRIPTION OF EMBODIMENTS OF THE INVENTION

Figure 1:
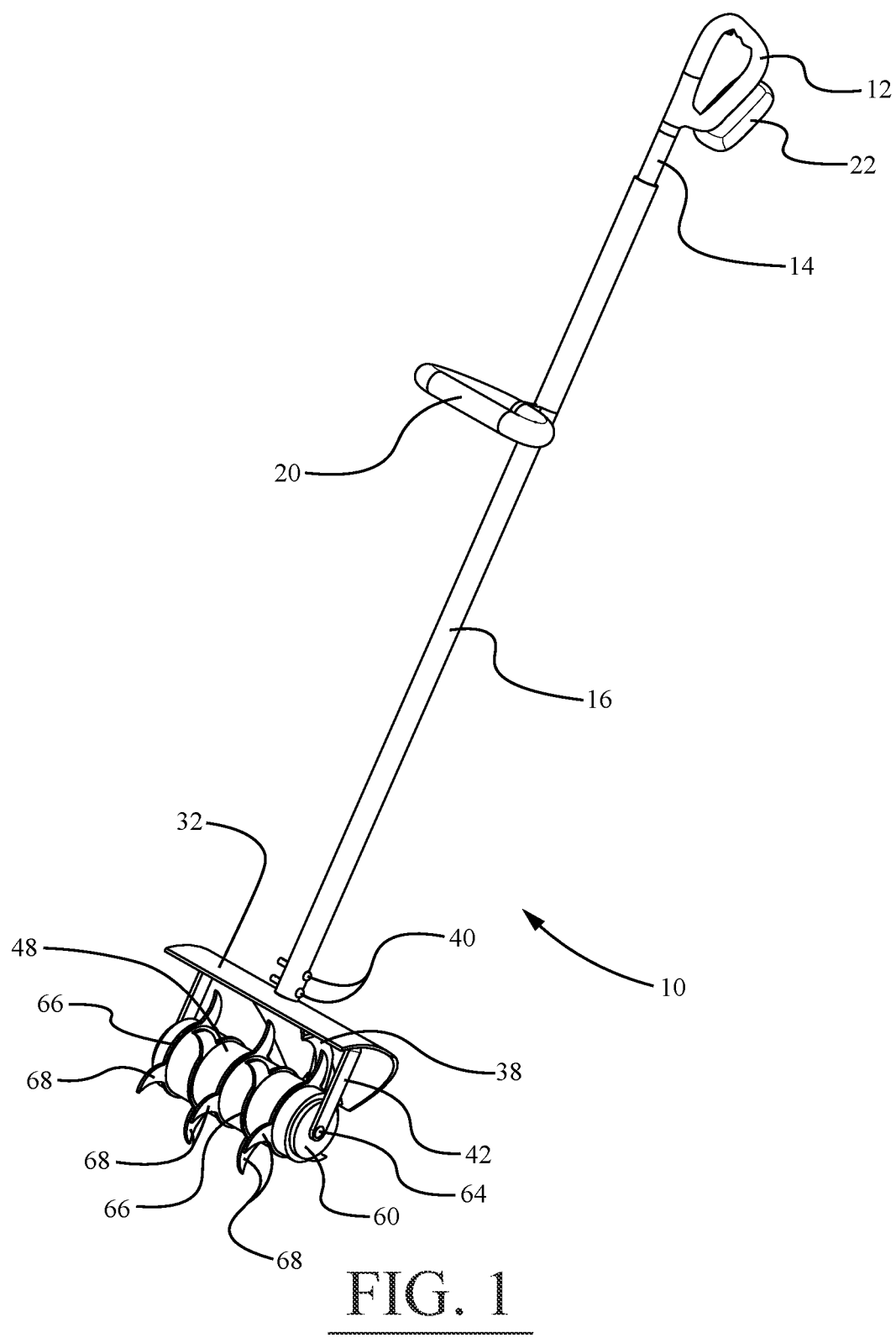
FIG. 1 is an overall perspective view of a garden tiller, according to a first illustrative embodiment of the invention.
Figure 2:
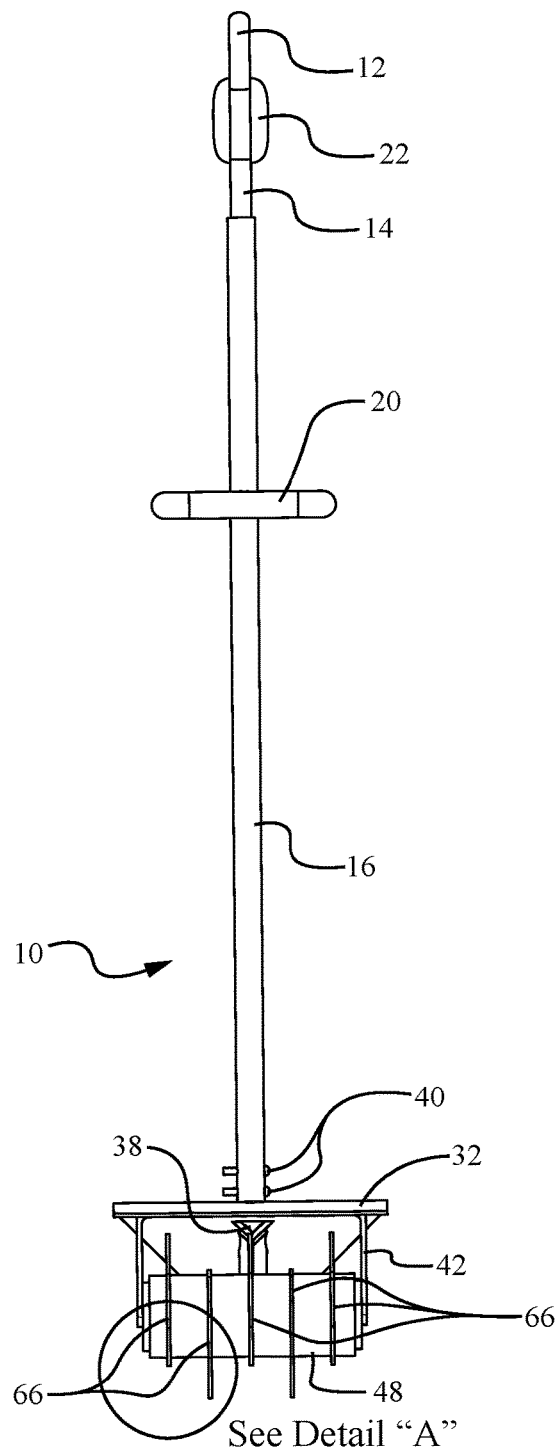
FIG. 2 is a front view of the garden tiller of FIG. 1.
Figure 3:
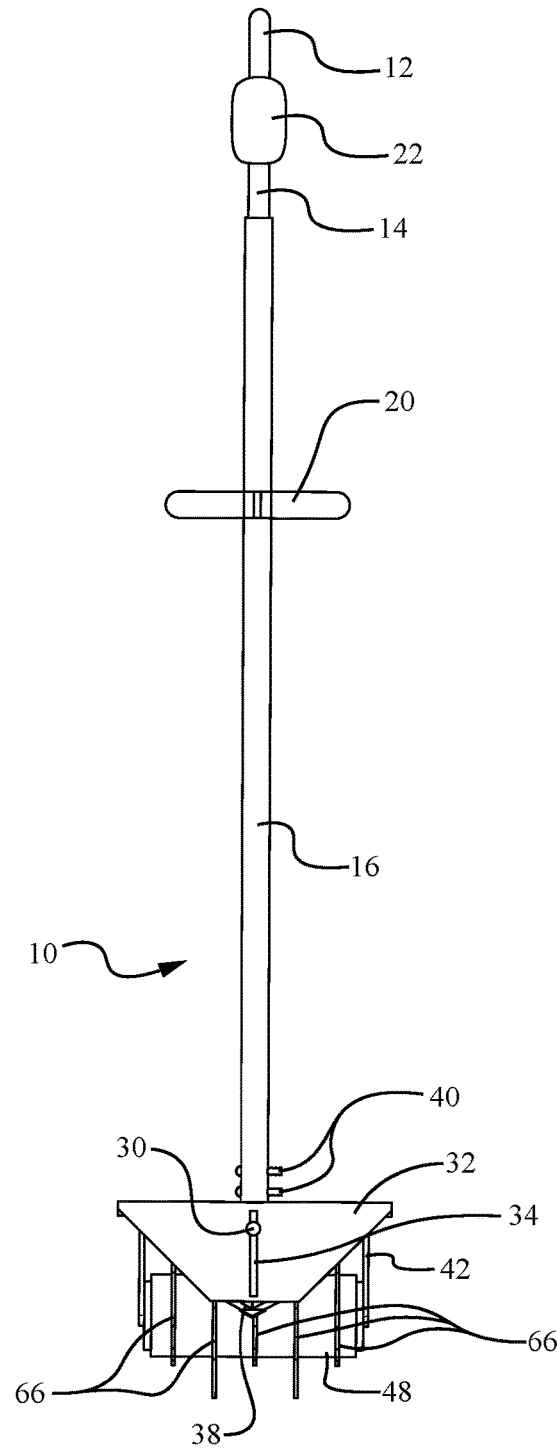
FIG. 3 is a rear view of the garden tiller of FIG. 1.
Figure 4:
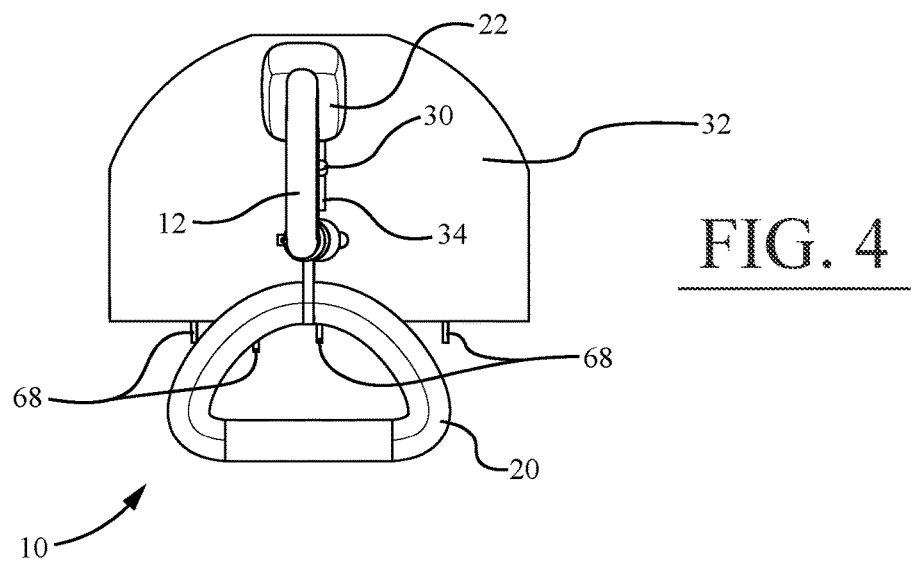
FIG. 4 is a top view of the garden tiller of FIG. 1.
Figure 5:
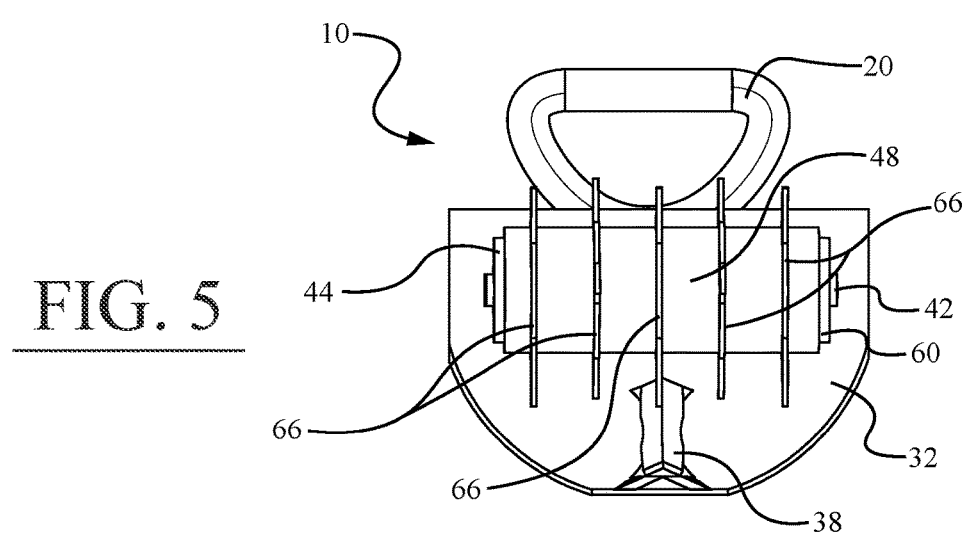
FIG. 5 is a bottom view of the garden tiller of FIG. 1.
Figure 6:
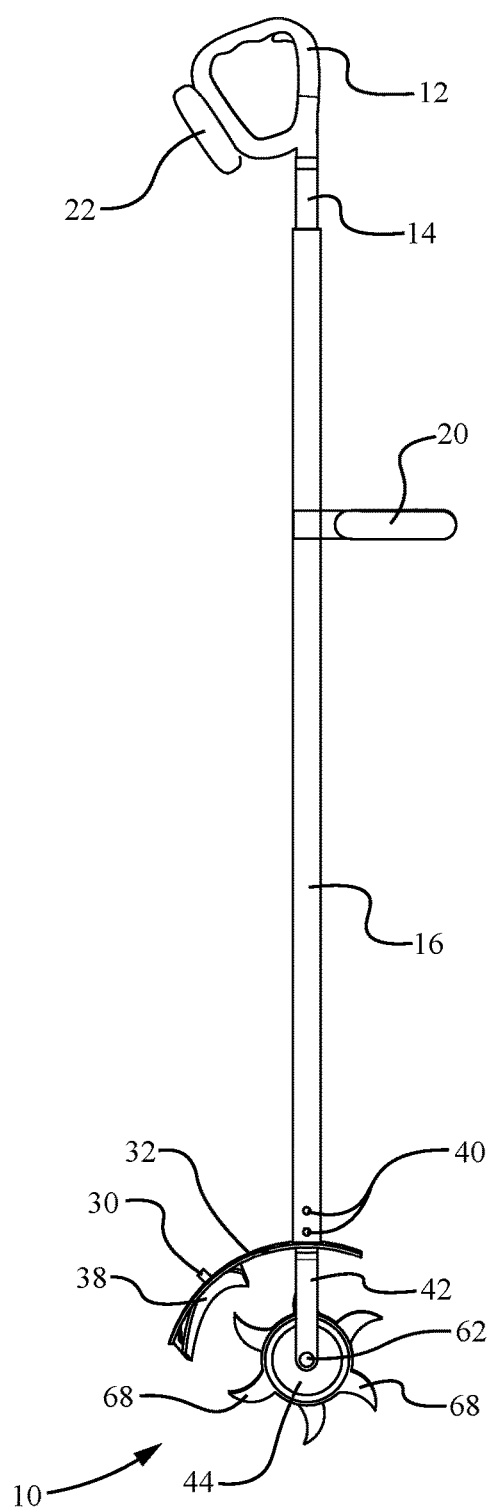
FIG. 6 is a first side view of the garden tiller of FIG. 1.
Figure 7:
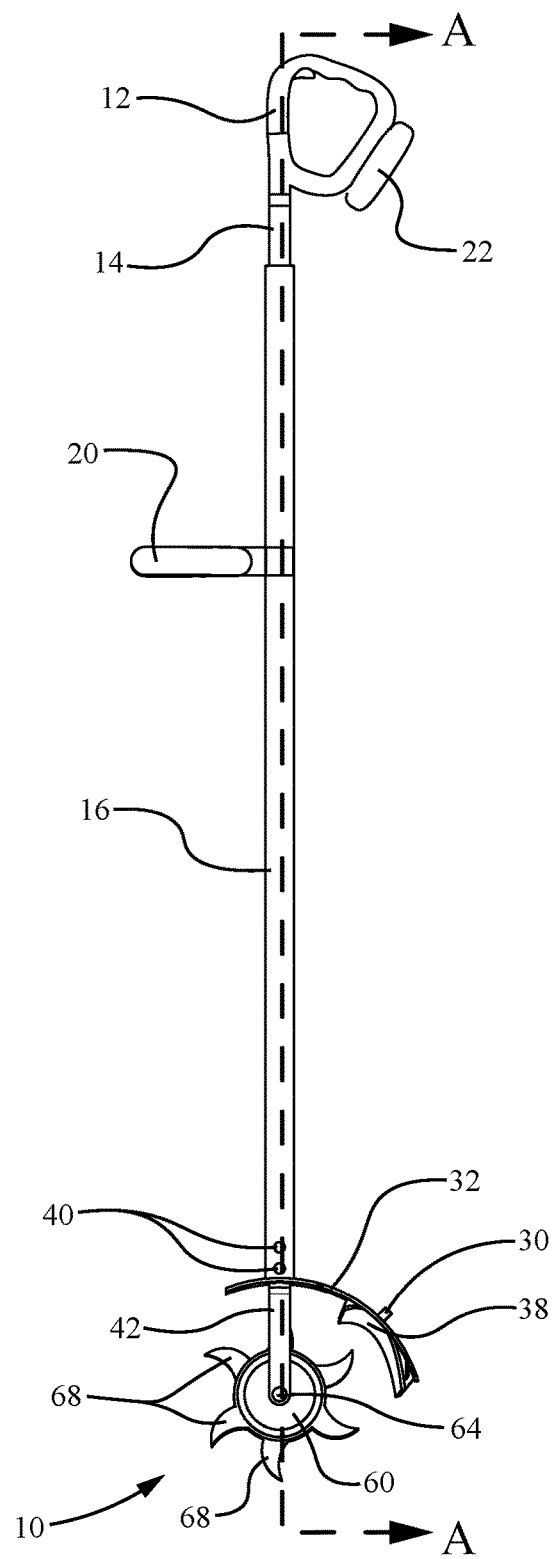
FIG. 7 is a second side view of the garden tiller of FIG. 1.

A first illustrative embodiment of a garden tiller is seen generally at 10 in FIGS. 1-8. With initial reference to FIGS. 1 and 8, it can be seen that the garden tiller 10 generally comprises at least one handle portion 12, 20 configured to be grasped by a user; a shaft portion 14, 16 coupled to the at least one handle portion 12, 20, the shaft portion 14, 16 having a first end and a second end, the second end of the shaft portion 14, 16 being oppositely disposed relative to the first end; and a head or body portion (as shown in FIGS. 13-16) coupled to the second end of the shaft portion 14, 16, the head or body portion including an impact motor 54 configured to drive a plurality of cultivating teeth 68 for loosening and/or displacing soil 82 (see FIGS. 15 and 16), the impact motor 54 configured to apply a baseline torque and an additional impact torque to the plurality of cultivating teeth 68 so as to more effectively break up compacted soil 82. As shown in the figures, in the first illustrative embodiment, the garden tiller 10 is in the form of a handheld garden tiller.

Figure 8:
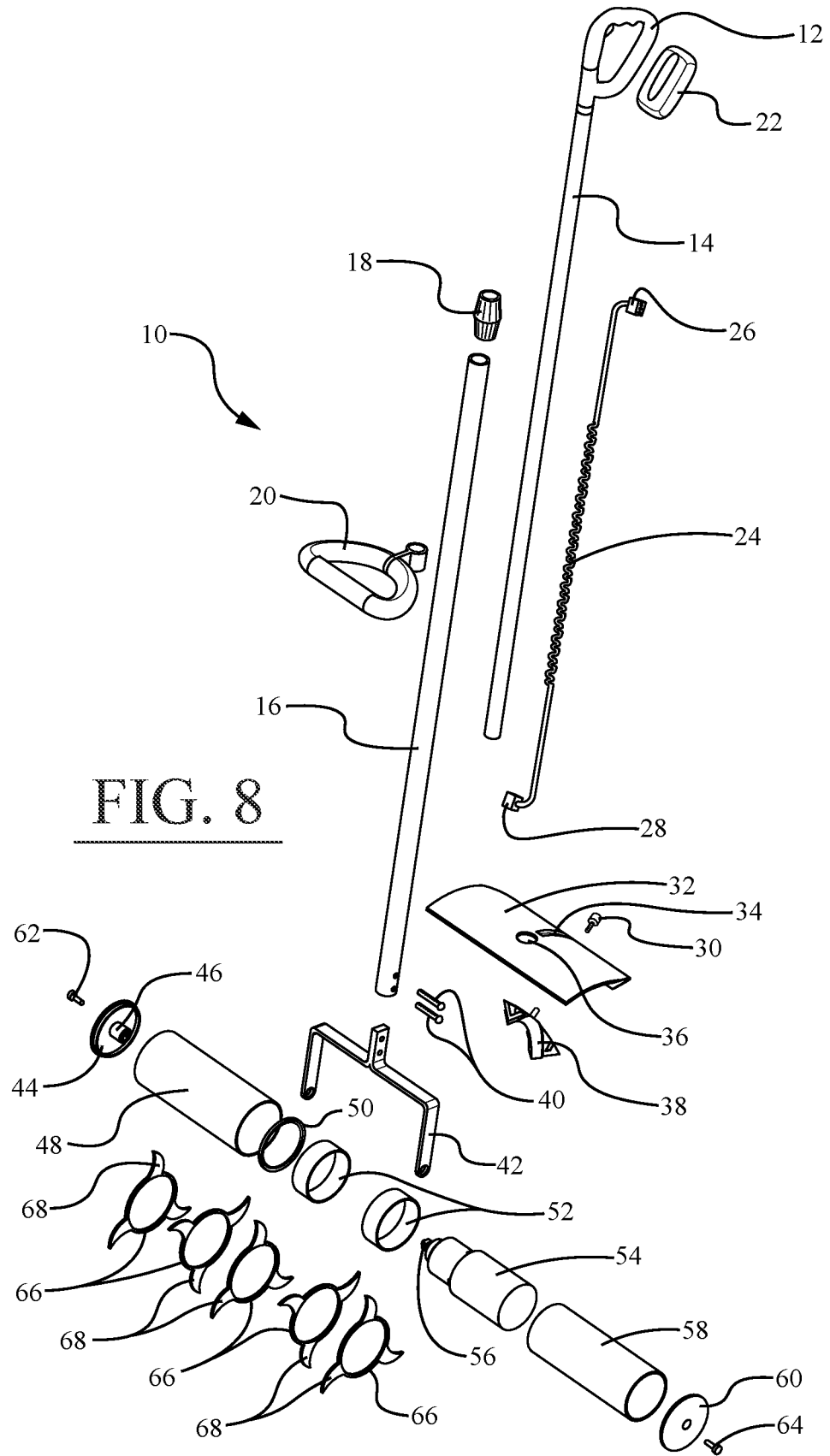
FIG. 8 is an exploded perspective view of the garden tiller of FIG. 1.

In the first illustrated embodiment, with combined reference to FIGS. 1 and 8, it can be seen that the shaft portion 14, 16 of the garden tiller 10 comprises a telescopic inner shaft 14 disposed within an external outer shaft 16 so that a length of the shaft portion 14, 16 is able to be adjusted. As shown in FIG. 8, the shaft portion 14, 16 may include a handle tightening collar 18 to fix the position of the telescopic inner shaft 14 relative to the external outer shaft 16 after the telescopic inner shaft 14 has been adjusted to its desired extending length by a user thereof. For example, after being twisted in a tightening direction by the user, the handle tightening collar 18 may frictionally engage the telescopic inner shaft 14 so that the telescopic inner shaft 14 is unable to move relative to the external outer shaft 16.

As shown in FIGS. 1 and 8, in the first illustrative embodiment, the at least one handle portion 12, 20 of the garden tiller 10 further comprises an upper handle portion 12 attached to the first end of the shaft portion 14, 16, and a lower handle portion 20 attached to the shaft portion 14, 16 between the first and second ends of the shaft portion 14, 16.

The upper handle portion 12 accommodates a first hand of the user, while the lower handle portion 20 accommodates a second hand of the user, thereby allowing the user to securely grip the handheld garden tiller 10.

Figure 13:
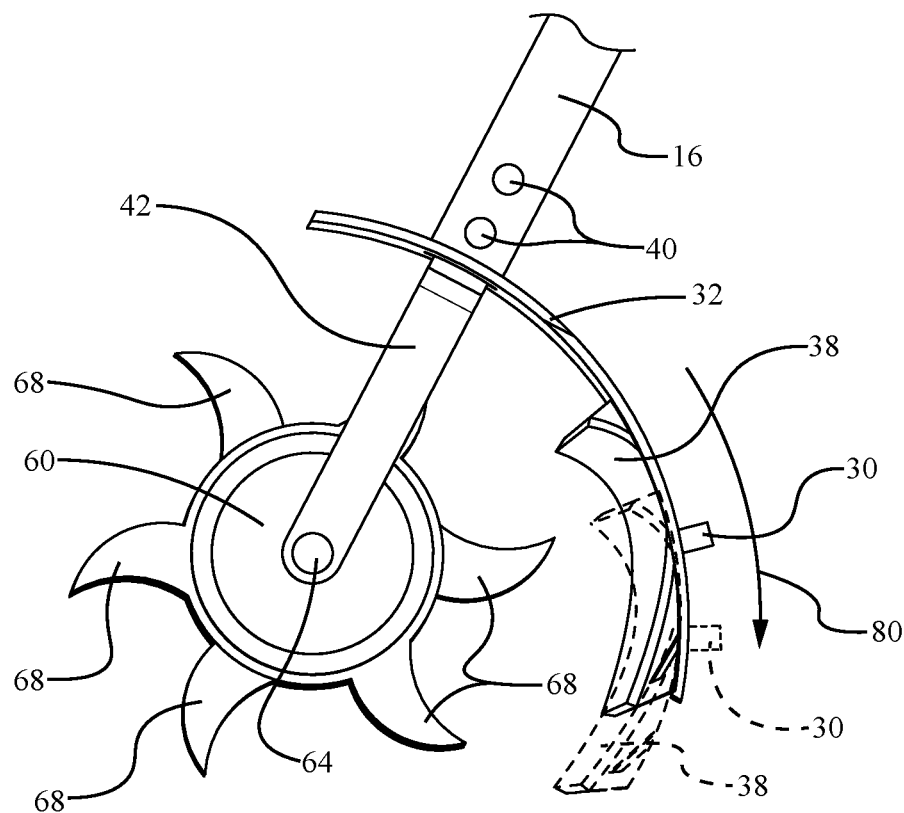
FIG. 13 is another enlarged side view of the head or body portion of the garden tiller of FIG. 1, wherein the adjustability of the trough device of the head or body portion is illustrated.
Figure 18:
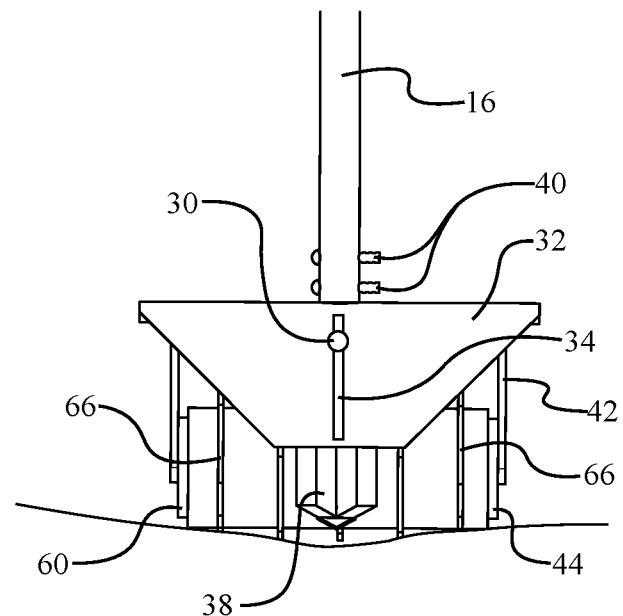
FIG. 18 is a partial, enlarged rear view of the head or body portion of the garden tiller of FIG. 1, wherein the trough device of the head or body portion is depicted in its highest setting.
Figure 19:
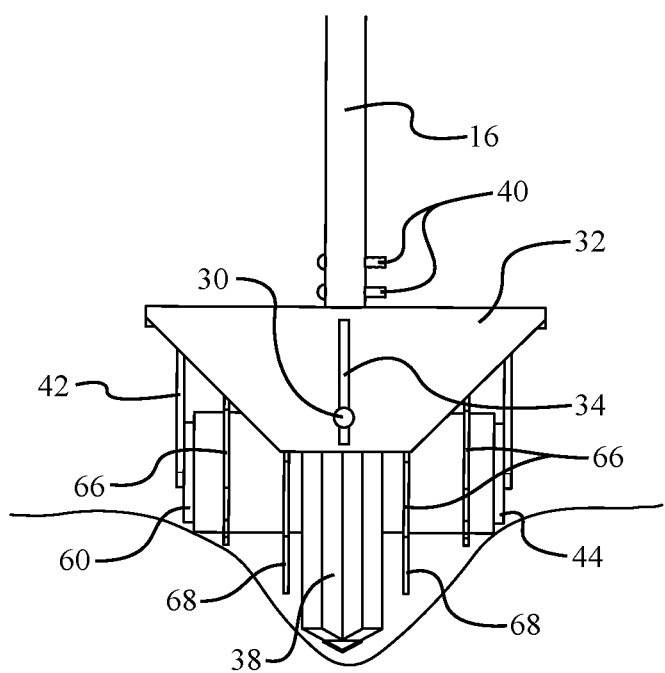
FIG. 19 is another partial, enlarged rear view of the head or body portion of the garden tiller of FIG. 1, wherein the trough device of the head or body portion is depicted in its lowest setting.

Now, with reference to FIGS. 1, 8, 15, and 16 of the first illustrative embodiment, the head or body portion of the garden tiller 10 will be described in detail. As shown in FIGS. 1, 8, 15, and 16, in the first illustrative embodiment, the head or body portion of the garden tiller 10 generally comprises a shield member 32, a trough device 38, and a motor assembly with impact motor 54. The shield member 32 of the tiller head or body portion is configured to prevent the soil loosened by the garden tiller 10 from being thrown backwards toward the user. As shown in the exploded view of FIG. 8, the shield member 32 of the tiller head or body portion comprises an elongate slot for accommodating a set pin 30 of the trough device 38, and a shaft hole 36 for allowing the upper end of the yoke-shaped motor bracket 42 to pass therethrough. In the first illustrated embodiment, as shown in FIGS. 13, 18, and 19, the trough device 38 is adjustably attached to the shield member 32 so that the user of the tiller 10 is able to adjust the trough device 38 to different heights for creating trenches of varying depths in the soil (see FIGS. 18 and 19). As best shown in FIG. 8, the trough device 38 is adjustably mounted to the shield member 32 via the set pin 30. When the set pin 30 is loosened by the user, the trough device 38 is able to slide in a curved path relative to the shield member 32 so that trough device 38 is able to create soil trenches of varying depths. For example, as diagrammatically represented by the curved arrow 80 in FIG. 13, the trough device 38 may be slid downward relative to the shield member 32 so that a deeper trench is able to be created in the soil. In FIG. 18, the trough device 38 of the head or body portion of the garden tiller 10 is depicted in its highest setting for creating a soil trench having a shallow depth. In FIG. 19, the trough device 38 of the head or body portion of the garden tiller 10 is depicted in its lowest setting for creating a soil trench having a deep depth.

In other embodiments, the shield member 32 could have other shapes that are different from the shape that is illustrated, and the shield member 32 could extend further down in the front of the head or body portion of the garden tiller 10.

Figure 9:
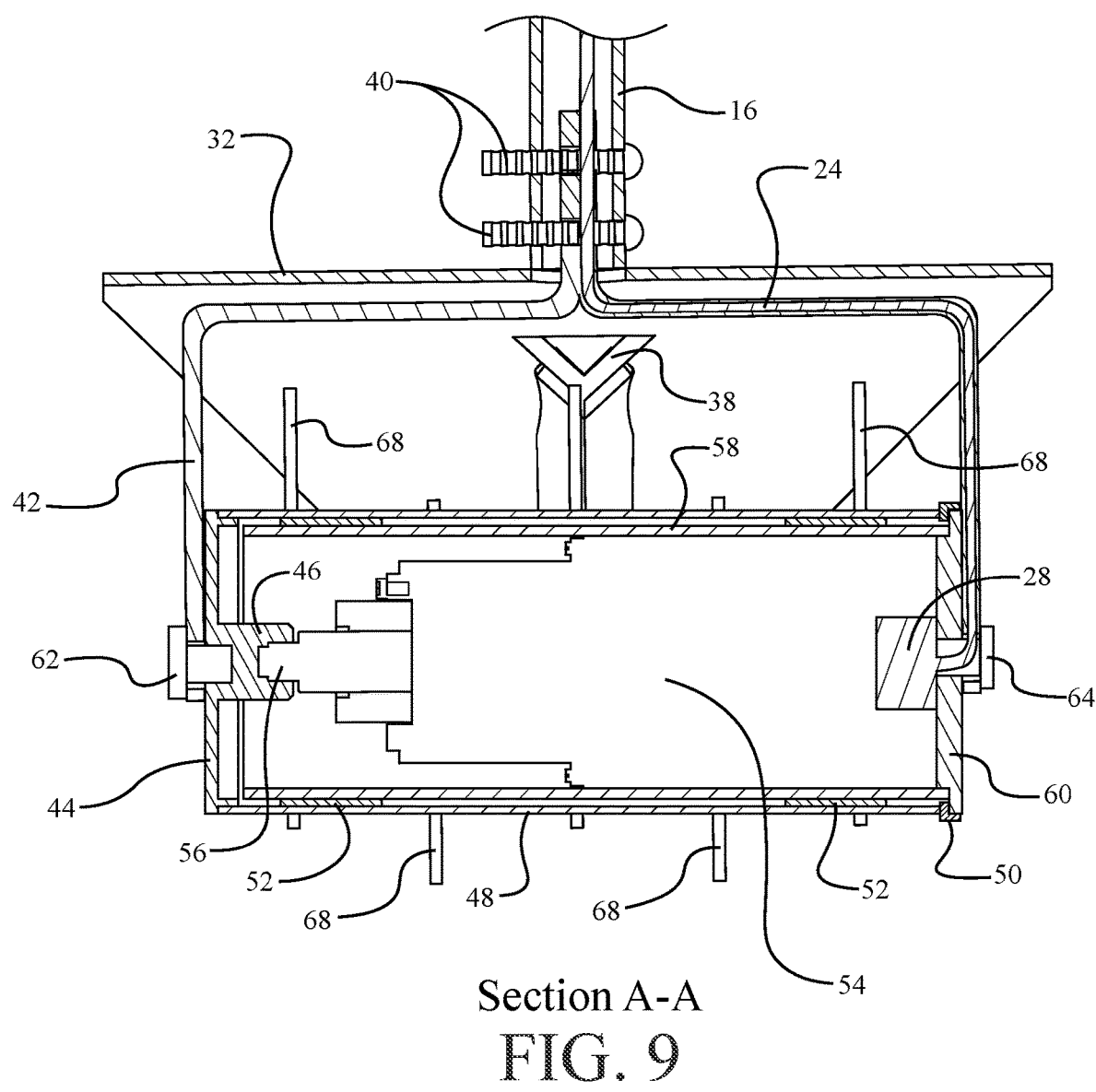
FIG. 9 is a partial sectional view cut through the head or body portion of the garden tiller of FIG. 1, wherein the section is generally cut along the cutting-plane line A-A in FIG. 7.
Figure 10:
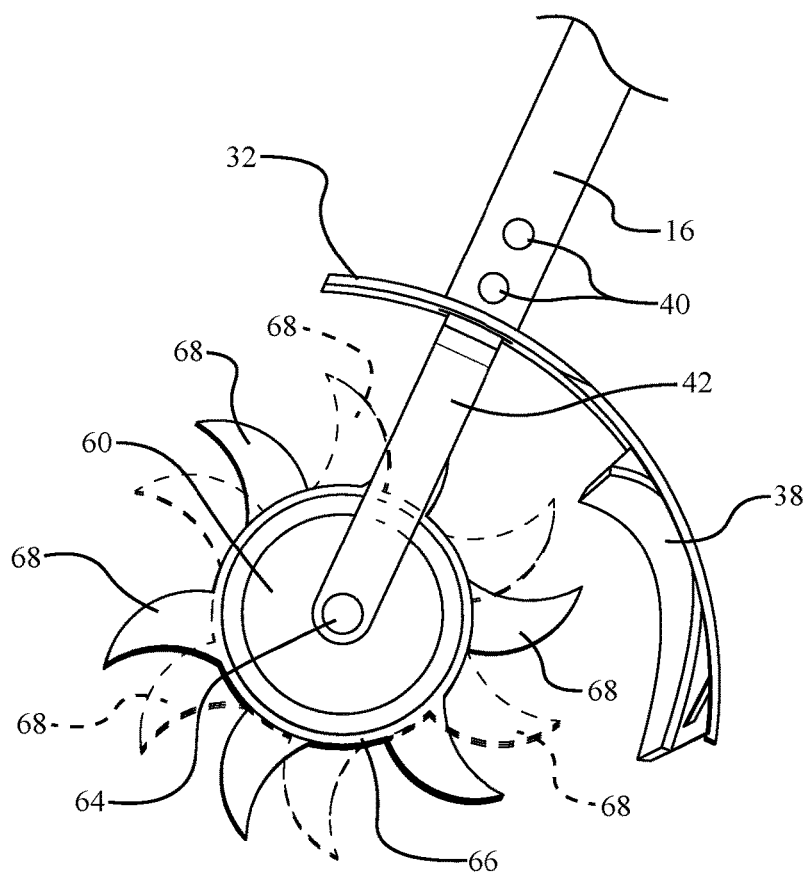
FIG. 10 is an enlarged side view of the head or body portion of the garden tiller of FIG. 1, wherein the rotation of the cultivating teeth on the head or body portion is illustrated.

With combined reference to FIGS. 1, 8, and 9, the motor assembly of the head or body portion of the garden tiller 10 will be explained. In the first illustrative embodiment, as best shown in FIGS. 8 and 9, the tiller head or body portion further comprises an inner cylinder member 58 and an outer cylinder member 48. The impact motor 54 is disposed within the inner cylinder member 58 (see FIG. 9), and the plurality of cultivating teeth 68 are attached to the outer cylinder member 48. As will be explained in further detail hereinafter, when the plurality of cultivating teeth 68 are being driven by the impact motor 54, the outer cylinder member 48 is configured to rotate relative to the inner cylinder member 58. In FIGS. 8 and 9, it can be seen that a plurality of frictionless bearings 52 may be provided between the inner cylinder member 58 and the outer cylinder member 48 so that the outer cylinder member 48 is able to freely rotate relative to the inner cylinder member 58 with minimal friction.

Referring again to the first illustrative embodiment of FIGS. 8 and 9, it can be seen that the outer cylinder member 48 of the motor assembly is provided with first and second end caps 44, 60 disposed on the opposite ends thereof such that the impact motor 54 is totally enclosed, thereby protecting the impact motor 54 from dirt and dust when it is being used to cultivate soil. Also, as shown in FIGS. 8 and 9, a seal member 50 may be provided between the second end cap 60 and the second end of the outer cylinder member 48 to prevent dust and dirt from entering the interior of the motor assembly. Referring again to FIGS. 8 and 9, it can be seen that the motor assembly with outer cylinder member 48, impact motor 54, and inner cylinder member 58, is mounted to the second end of the shaft portion 14, 16 by a yoke-shaped mounting bracket 42. As best shown in FIG. 9, the opposed lower ends of the yoke-shaped mounting bracket 42 are connected to the first and second end caps 44, 60 by respective first and second housing pins 62, 64, while the upper end of the yoke-shaped mounting bracket 42 is secured to the external outer shaft 16 by bracket mounting pins 40.

In the first illustrative embodiment, the impact motor 54 is in the form of an electric motor, and the garden tiller 10 further comprises a battery power source (e.g., a battery pack 22) for powering the electric motor (see FIG. 1). With combined reference to FIGS. 8 and 9, it can be seen that the battery pack 22, which is located at the first end of the shaft portion 14, 16 in the first illustrative embodiment, is electrically connected to the electric impact motor 54 by means of an electrical cable 24. More specifically, referring to FIGS. 8 and 9, the first end 26 of the electrical cable 24 is connected to the battery pack 22, while the second end 28 of the electrical cable 24 is connected to the impact motor 54. As shown in the sectional view of FIG. 9, the electrical cable 24 is routed through the central cavity of the shaft portion 14, 16 to the battery pack 22 at the upper end of the shaft portion 14, 16. Advantageously, the impact motor 54 of the illustrative embodiment creates additional torque by means of creating a rotational impact force with a spring, hammer, and anvil. The turning motor shaft 56 of the impact motor 54 compresses a spring that is then released, which then drives a hammer against an anvil on/adjacent to the shaft 56.

In other embodiments, the battery pack 22 for providing power to the impact motor 54 could be located in other areas on the garden tiller 10, such as closer to the head or body portion of the garden tiller 10.

As shown in FIGS. 1, 8, 10, and 13, in the first illustrative embodiment, the cultivating teeth 68 of the garden tiller 10 are disposed on a plurality of ring members 66. The ring members 66 are fixedly attached to the outer cylinder member 48 such that the ring members 66 and their associated cultivating teeth 68 rotate together with the outer cylinder member 48. As shown in FIGS. 1 and 8, the cultivating teeth 68 may be circumferentially spaced apart about the circumferences of their respective ring members 66. For example, as illustrated in FIG. 8, the cultivating teeth 68 on a particular ring member 66 may be spaced approximately 120 degrees apart from one another about the circumference of the ring member 66. In other embodiments, it is to be understood each ring member 66 may be provided with a different quantity of teeth 68. Also, in other embodiments, it is to be understood a different quantity of ring members 66 may be provided.

Figure 14A:
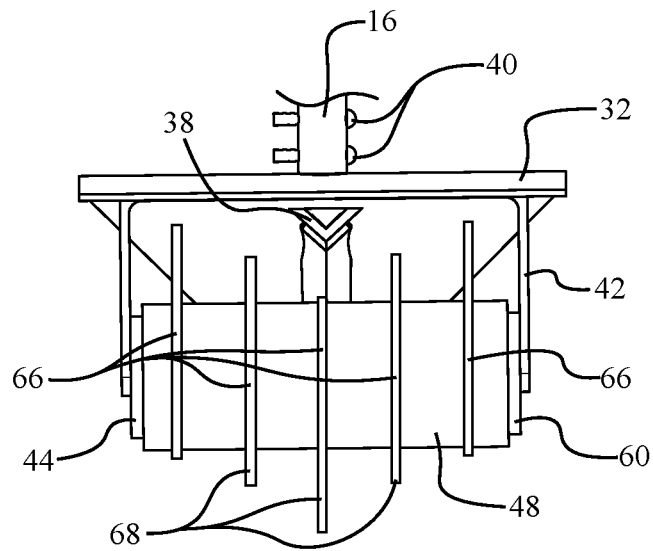
FIG. 14A is a first partial front view of the head or body portion of the garden tiller of FIG. 1, wherein the cultivating teeth of the head or body portion are illustrated in a first position.
Figure 14B:
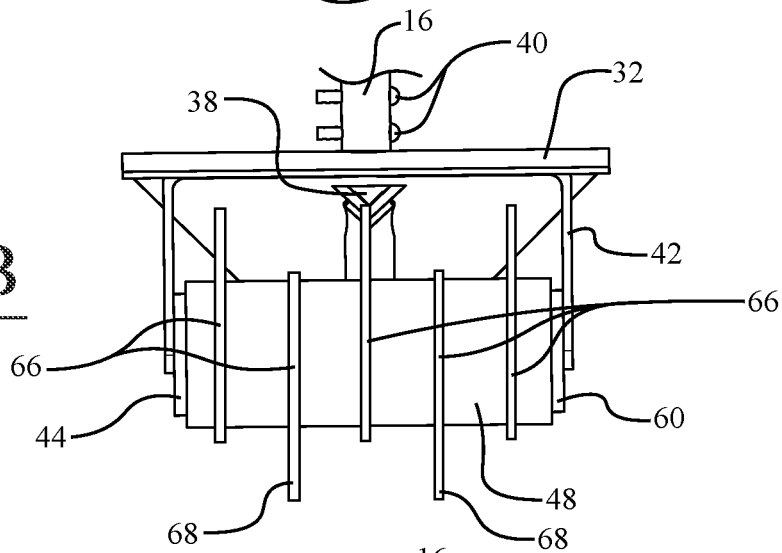
FIG. 14B is a second partial front view of the head or body portion of the garden tiller of FIG. 1, wherein the cultivating teeth of the head or body portion are illustrated in a second position.
Figure 14C:
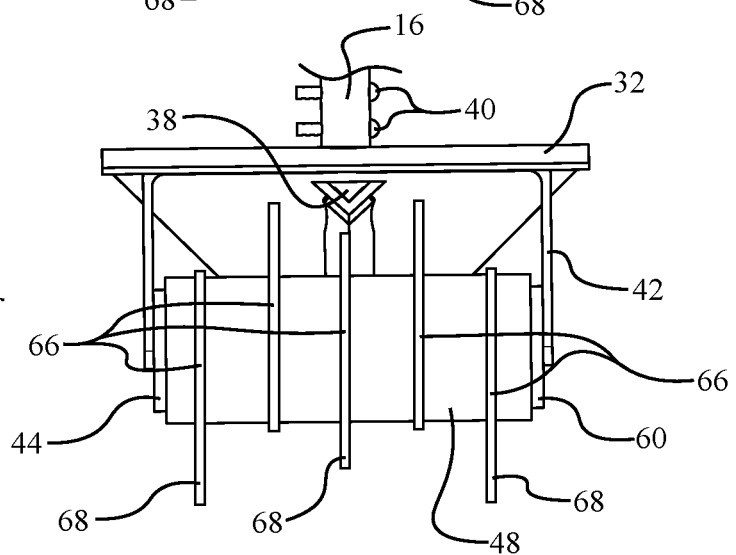
FIG. 14C is a third partial front view of the head or body portion of the garden tiller of FIG. 1, wherein the cultivating teeth of the head or body portion are illustrated in a third position.

In addition, as depicted in the first illustrative embodiment of FIGS. 1 and 8, it can be seen that a plurality of ring members 66 are axially spaced apart from one another along a length of the outer cylinder member 48. Each of the plurality of ring members 66 has a plurality of circumferentially spaced-apart teeth 68, and at least some of the teeth 68 on adjacent ring members 66 are circumferentially staggered relative to one another so as to contact the soil at varying heights. FIGS. 14A-14C illustrate three different positions of the cultivating teeth 68 as they are rotated by the impact motor 54. In FIG. 14A, the cultivating teeth 68 of the head or body portion of the garden tiller 10 are illustrated in a first position. In FIG. 14B, the cultivating teeth 68 of the head or body portion of the garden tiller 10 are illustrated in a second position. And, in FIG. 14C, the cultivating teeth 68 of the head or body portion of the garden tiller 10 are illustrated in a third position. As shown in these figures, the soil is impacted at different locations by the cultivating teeth 68 of the garden tiller 10. Advantageously, the soil contact sequencing of the cultivating teeth 68 depicted in FIGS. 14A-14C reduces the frictional resistance of the soil that is experienced by the garden tiller 10.

Figure 17:
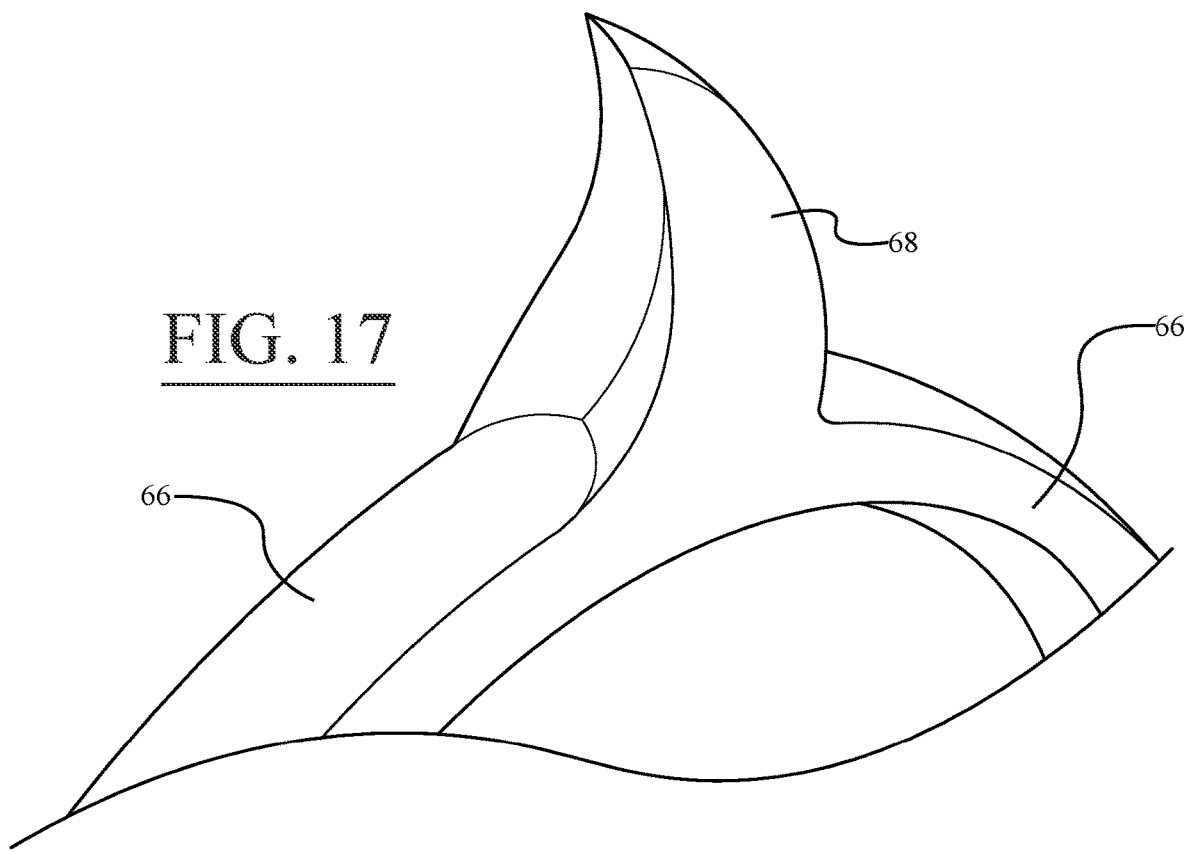
FIG. 17 is a partial, enlarged view of one of the cultivating rings of the head or body portion of the garden tiller of FIG. 1, wherein the details of one of the cultivating teeth are illustrated.

Next, referring to the detail view of FIG. 17, an exemplary one of the cultivating teeth 68 of the garden tiller 10 will be described. As shown in FIG. 17, in the first illustrative embodiment, each of the cultivating teeth 68 has a tapered body portion with a sharp tip to facilitate the breaking up of the compacted soil. In FIG. 17, it can be seen that the base portion of the cultivating tooth 68 is significantly wider than the tip portion. The cultivating teeth 68 of the garden tiller 10 are uniquely designed to minimize the frictional drag of cutting through soil, while still moving soil up and out of the area of active digging. In one or more embodiments, the profile of each cultivating tooth 68 may resemble that of an aardvark claw, which is very effective for digging and displacing soil.

In the first illustrative embodiment, the ring members 66 and the cultivating teeth 68 may be cut or stamped from a piece of metal. Also, in other embodiments, the cultivating teeth 68 could be formed integrally with the outer cylinder member 48 of the garden tiller 10 such that the ring members 66 would not be required.

Figure 11:
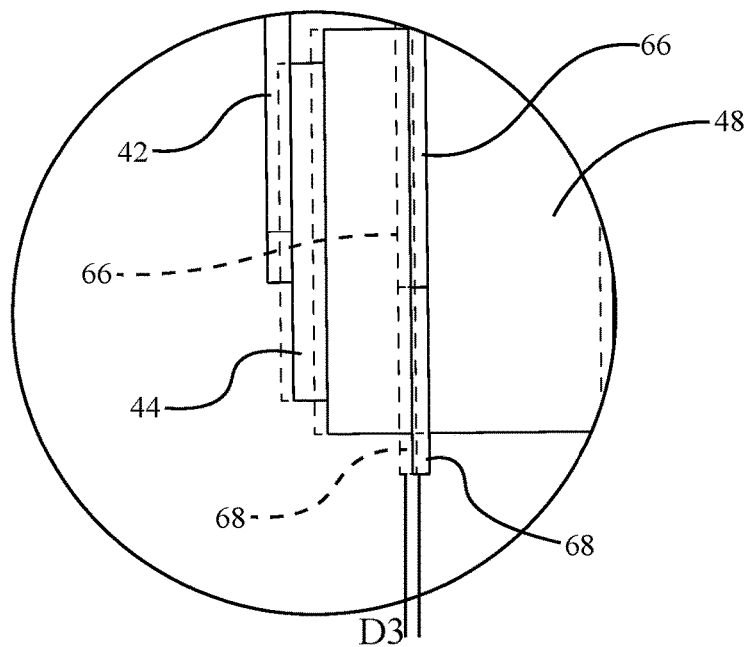
FIG. 11 is a partial, enlarged front view of the head or body portion of the garden tiller illustrated in FIG. 2 (Detail "A"), wherein one of the cultivating teeth on the head or body portion is illustrated.
Figure 15:
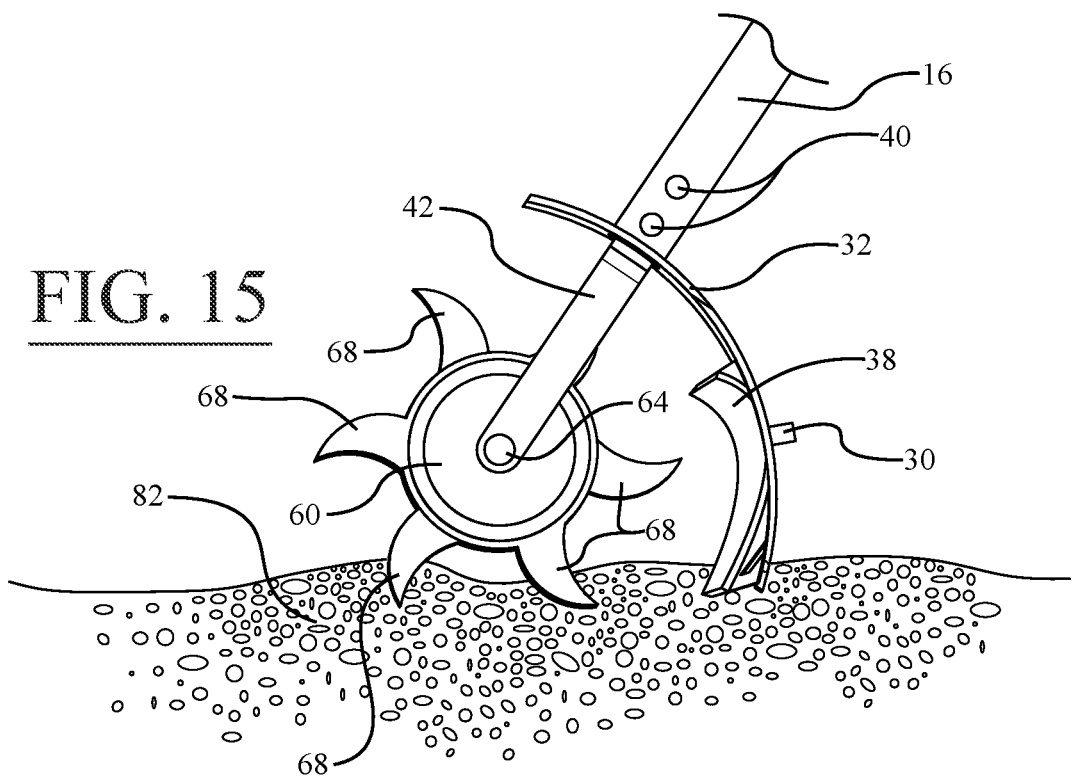
FIG. 15 is an enlarged side view of the head or body portion of the garden tiller of FIG. 1 being used to cultivate soil, wherein an initial stage in the soil cultivating process is illustrated.
Figure 16:
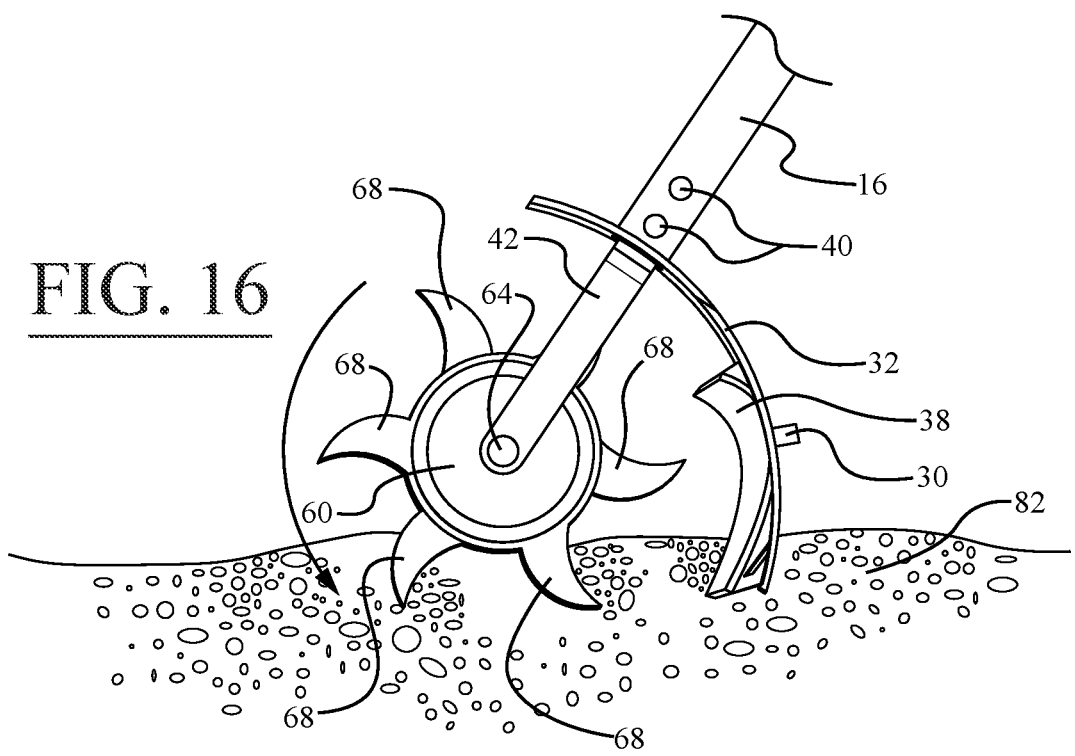
FIG. 16 is another enlarged side view of the head or body portion of the garden tiller of FIG. 1 being used to cultivate soil, wherein a latter stage in the soil cultivating process is illustrated.

Now, with reference primarily to FIGS. 1, 8, 9, and 12, the operational functionality of the first illustrative garden tiller 10 will be described. Referring initially to the sectional view of FIG. 9, the shaft 56 of the impact motor 54 is affixedly connected to a bore within a protruding element 46 of the first end cap 44 such that the rotation and torque of the impact motor 54 is imparted on the first end cap 44. In turn, the first end cap 44, which is affixed to the outer cylinder member 48, imparts the rotation and torque from the impact motor 54 to the outer cylinder member 48. The plurality of frictionless bearings 52 between the outer cylinder member 48 and the inner cylinder member 58 allow the outer cylinder member 48 to rotate freely relative to the stationary inner cylinder member 58. As explained above, because the ring members 66 with the cultivating teeth 68 are affixedly attached to the external surface of the outer cylinder member 48, the rotation and torque generated by the impact motor 54 is imparted on the cultivating teeth 68 of the garden tiller 10 so that the soil is able to be effectively cultivated. For example, FIG. 15 depicts an initial stage in the soil cultivating process where the impact torque is imparted on the soil 82 by the cultivating teeth 68, while FIG. 16 depicts a latter stage in the soil cultivating process where the impact torque imparted on the soil 82 starts breaking up the clumps in the soil 82. Because the impact torque is applied very rapidly during the cultivating process, it is to be understood that the latter cultivating stage in FIG. 16 happens shortly after the initial cultivating stage in FIG. 15. As shown in FIG. 11, the impact torque also generates a slight lateral vibration of the outer cylinder member 48 and the cultivating teeth 68 connected thereto (as represented by the displacement $D_3$ in FIG. 11).

Figure 12:
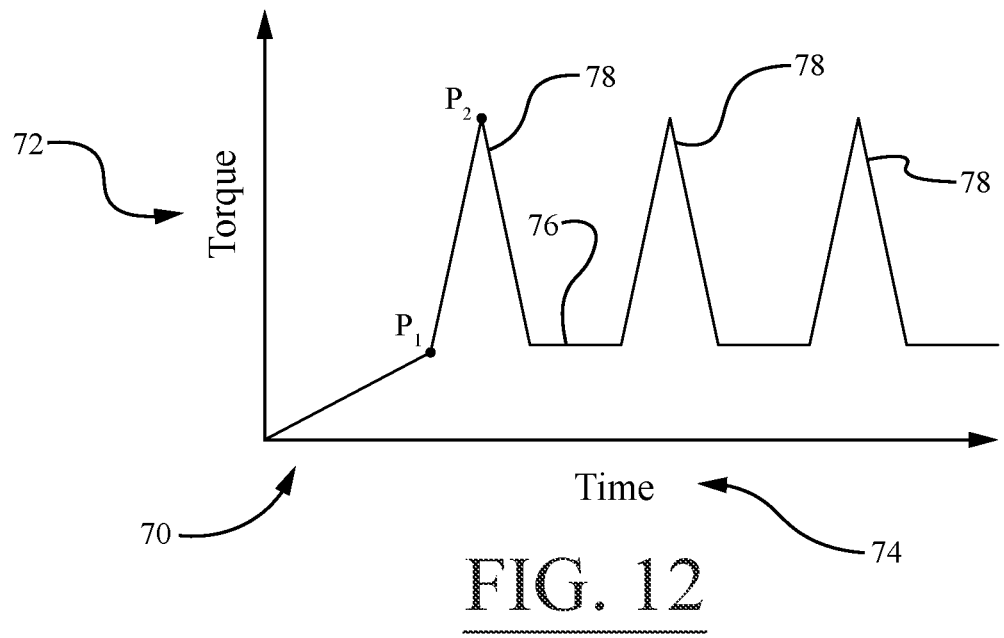
FIG. 12 illustrates an exemplary torque curve for the impact motor of the garden tiller of FIG. 1.

An exemplary torque-time graph 70 for the impact motor 54 of the garden tiller 10 is depicted in FIG. 12. In this figure, the torque of the motor 54 is presented on the y-axis 72 of the graph 70, while time is presented on the x-axis 74 of the graph 70. As shown in FIG. 12, the torque curve 76 contains a plurality of recurring peaks 78 that represent the additional impact torque delivered by the impact motor 54 of the garden tiller 10. As such, the impact motor 54 advantageously delivers a baseline torque represented by the straight line segments in FIG. 12, which is supplemented by impact torque peaks 78 that result in a much greater magnitude of torque being applied to the soil for more effectively cultivating the soil. Similar to an impact driver, the impact torque peaks 78 have a cam-hammering effect that creates a substantial spike in the garden tiller torque magnitude that may occur, for example, one-thousand times per minute or more.

A second illustrative embodiment of a garden tiller is seen generally at 100 in FIGS. 20-27. Referring to these figures, it can be seen that, in some respects, the second illustrative embodiment is similar to that of the first illustrative embodiment. Moreover, many elements are common to both such embodiments. For the sake of brevity, the elements that the second embodiment of the garden tiller has in common with the first embodiment will not be discussed in detail because these components have already been described above.

Like the garden tiller 10 described above, the garden tiller 100 of the second illustrative embodiment generally comprises at least one handle portion 102 configured to be grasped by a user; a shaft portion 104 coupled to the at least one handle portion 102 (see FIG. 20), the shaft portion 104 having a first end and a second end, the second end of the shaft portion 104 being oppositely disposed relative to the first end; and a body portion (as shown in FIGS. 30-32) coupled to the second end of the shaft portion 104, the body portion including an impact motor 128, 148, 150 (see FIG. 27) configured to drive a plurality of cultivating teeth 156 for loosening and/or displacing soil (see FIGS. 22, 33A, and 33B), the impact motor 128, 148, 150 configured to apply a baseline torque and an additional impact torque to the plurality of cultivating teeth 156 so as to more effectively break up compacted soil. As shown in the figures, in the second illustrative embodiment, the garden tiller 100 comprises a plurality of wheels 110, 114 for enabling the garden tiller 100 to be rolled along the ground.

Figure 20:
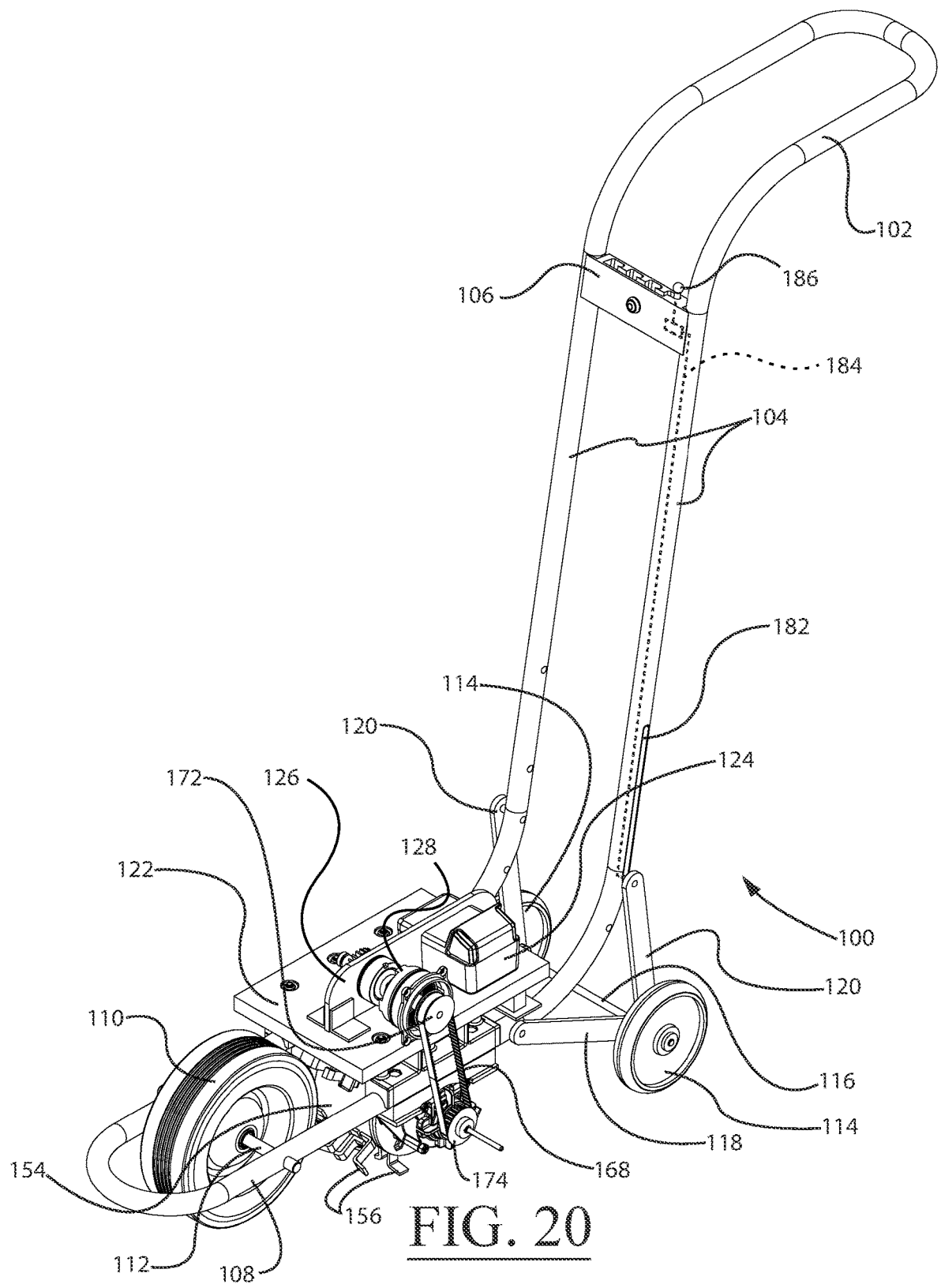
FIG. 20 is an overall perspective view of a garden tiller, according to a second illustrative embodiment of the invention.
Figure 23:
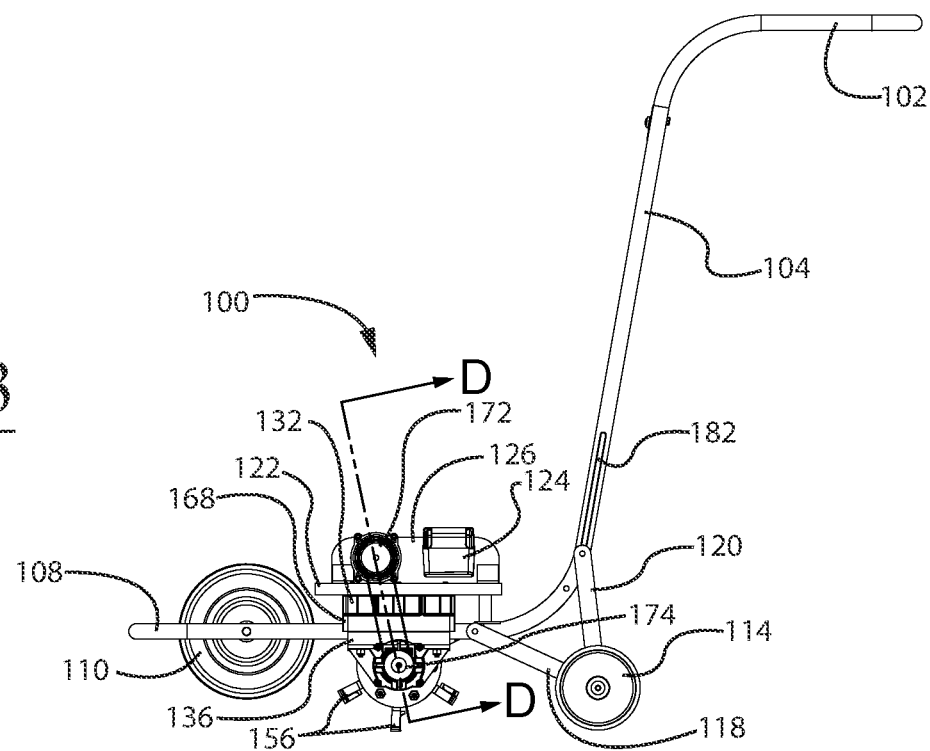
FIG. 23 is a first side view of the garden tiller of FIG. 20.
Figure 24:
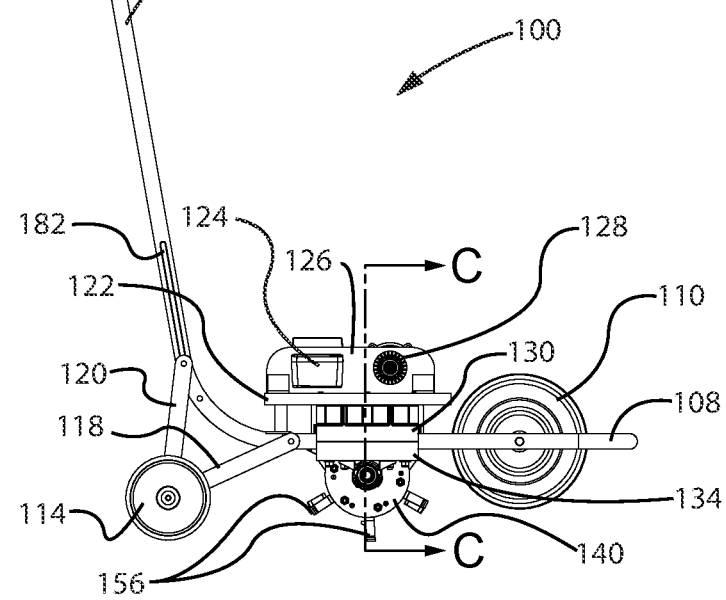
FIG. 24 is a second side view of the garden tiller of FIG. 20.
Figure 25:
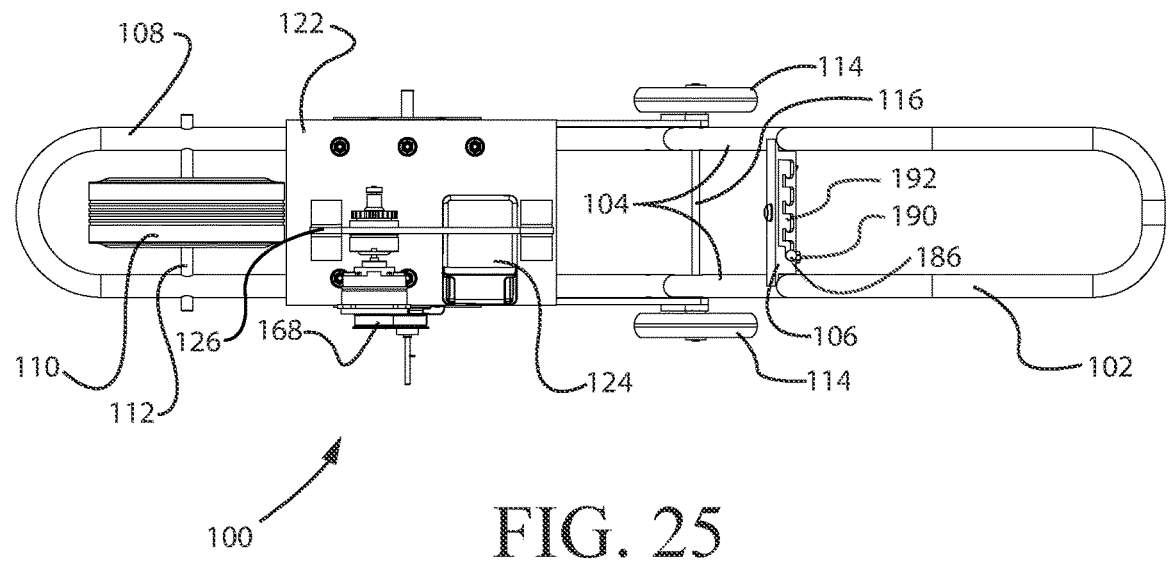
FIG. 25 is a top view of the garden tiller of FIG. 20.
Figure 26:
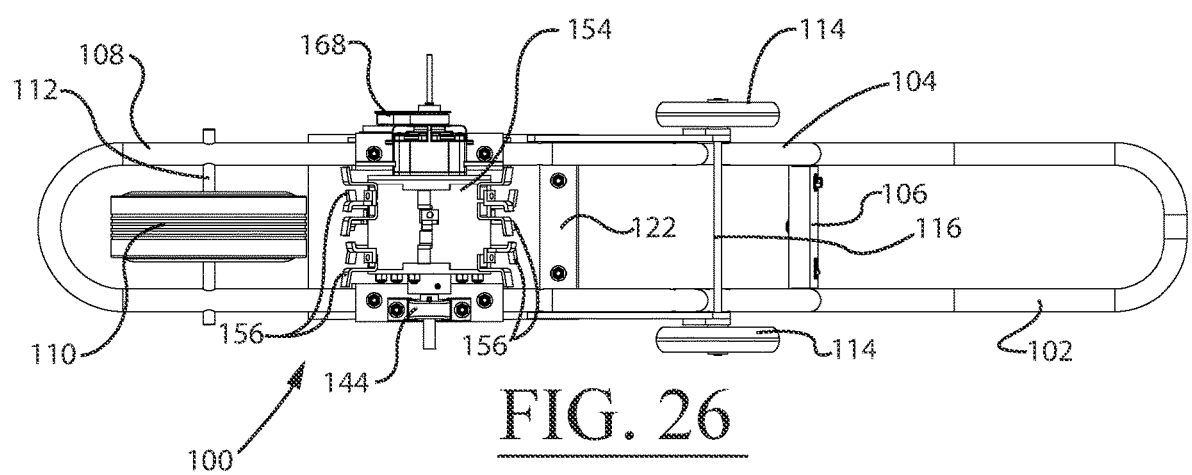
FIG. 26 is a bottom view of the garden tiller of FIG. 20.
Figure 36:
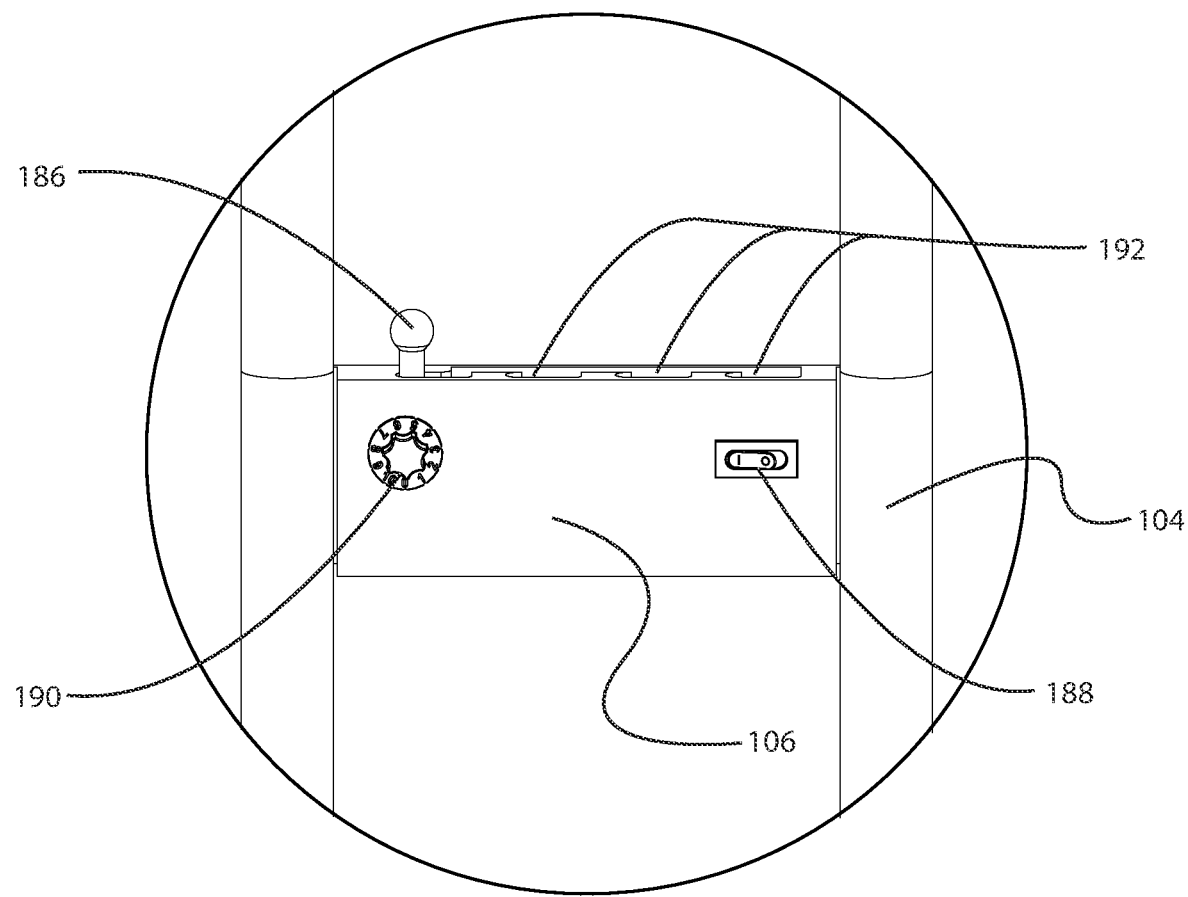
FIG. 36 is a partial, enlarged rear view of the control panel of the garden tiller illustrated in FIG. 22 (Detail "B").

In the second illustrated embodiment, with combined reference to FIGS. 20, 22, and 36, it can be seen that the shaft portion 104 of the garden tiller 100 comprises a control panel 106 with a plurality of adjustment devices 186, 188, 190 for controlling the operation of the garden tiller 100. The lever knob 186 on the top of the control panel 106 adjusts the tiller depth into the soil. When the lever knob 186 is moved into a selected one of the height adjustment slots 192, the actuator rod 184, which is connected to one of the upper rear axle support members 120, adjusts the garden tiller 100 to a particular depth setting. In FIG. 36, leftmost slot 192 corresponds to the smallest depth setting, while the rightmost slot 192 corresponds to the largest depth setting. The on/off power switch 188 in FIG. 36 activates and deactivates the garden tiller 100, while power or speed control knob 190 regulates the motor power or speed of the garden tiller 100.

In alternative embodiment, the garden tiller 100 may be provided with a handle structure having a different configuration. For example, the tubular member forming the handle structure could flare out at the end of the handle portion in order to accommodate two hands of the user, rather than a single hand of the user. Also, the handle portion and shaft portion could collapse onto itself (e.g., fold approximately in half) to allow the garden tiller 100 to be more compactly stored and transported.

Figure 27:
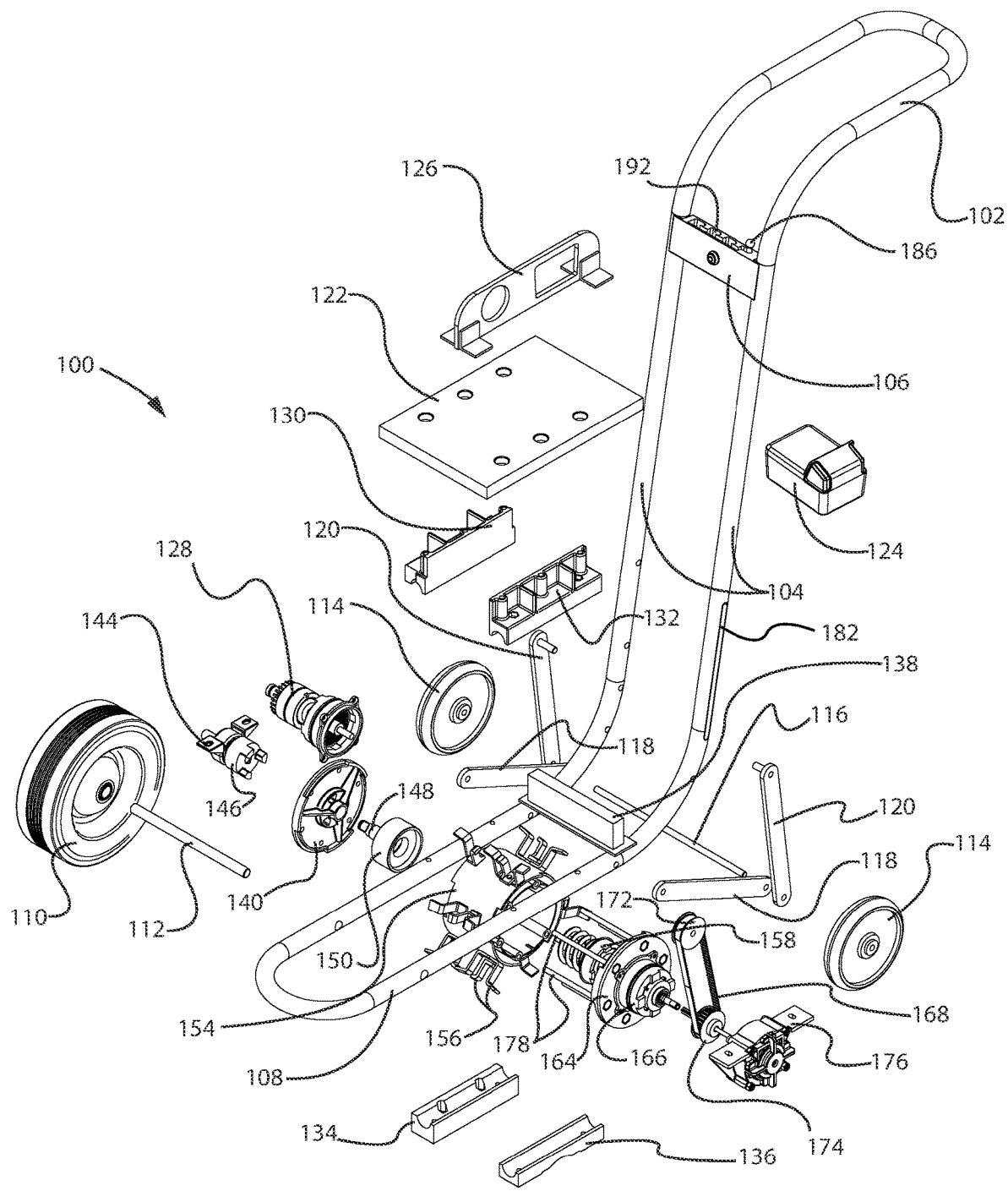
FIG. 27 is an exploded perspective view of the garden tiller of FIG. 20.

As best shown in FIG. 20, in the second illustrative embodiment, the garden tiller 100 has a three-point wheel base and a narrow frame structure. The body portion of the garden tiller 100 comprises a lower frame portion 108 that is connected to the second end of the shaft portion 104. With combined reference to FIGS. 20 and 27, a front wheel 110 of the garden tiller 100 is coupled to the lower frame portion 108 by a front axle member 112. The front wheel 110 is pivotal about the front axle member 112. The body portion of the garden tiller 100 also comprises a pair of rear wheels 114 that are pivotal about a rear axle member 116. As shown in FIGS. 20 and 27, the rear axle member 116 is coupled to the lower frame portion 108 by a first pair of lower rear axle support members 118 and a second pair of upper rear axle support members 120. The upper rear axle support members 120 are slidably adjustable along the shaft portion 104 so as to form a height adjustment mechanism for the garden tiller 100. The height adjustment mechanism enables the garden tiller 100 to be adjustable to different heights for varying a soil cultivating depth. As shown in FIG. 20, the top end of each support member 120 has a fastener member (e.g., a bolt) that is slidably adjustable along the length of the slot 182, when the support member 120 is displaced by the actuator rod 184.

Now, with reference to FIGS. 20 and 27-29 of the second illustrative embodiment, the body portion of the garden tiller 100 will be described in detail. As shown in FIGS. 20 and 27, in the second illustrative embodiment, the body portion of the garden tiller 100 generally comprises an impact motor and impact torque assembly 128, 180 and a battery power source (e.g., a battery pack 124) for powering the electric motor 128 of the impact motor and impact torque assembly 128, 180. The battery pack 124, which is located at the rear of the body portion in the second illustrative embodiment, near the shaft portion 104, is electrically connected to the electric motor 128 by means of an electrical cable. Referring again to FIGS. 20 and 27, it can be seen that the battery pack 124 and the electric motor 128 are attached to a mounting bracket 126, which is mounted to the top surface of a motor and battery pack support platform 122. The motor and battery pack support platform 122 is disposed above the lower frame portion 108 of the garden tiller 100, while the impact torque assembly 180 is disposed beneath the lower frame portion 108 (see FIG. 20). As shown in FIGS. 20 and 27, the motor and battery pack support platform 122 is attached to opposite top sides of the lower frame portion 108 by respective first and second upper mounting bracket members 130, 132. A first lower mounting bracket member 134 is attached to, and provided beneath the first upper mounting bracket member 130 so as to sandwich a first tubular section of the lower frame portion 108 between the upper and lower mounting bracket members 130, 134. A second lower mounting bracket member 136 is attached to, and provided beneath the second upper mounting bracket member 132 so as to sandwich a second tubular section of the lower frame portion 108 between the upper and lower mounting bracket members 132, 136. As shown in FIG. 27, a rear support member 138 is also provided at the rear end of the lower frame portion 108 where it is joined to the shaft portion 104 so as to provide further support for the rear part of the motor and battery pack support platform 122. That is, the weight of the rear part of the motor and battery pack support platform 122 is supported by the rear support member 138.

In the second illustrative embodiment, with combined reference to FIGS. 20 and 27, the impact motor 128, 148, 150 comprises an electric motor 128 remotely located from an impact hammer 150 and anvil 148. The impact hammer 150 and anvil 148 are operatively coupled to a rotatable outer cylinder or barrel member 154, and the plurality of cultivating teeth 156 are attached to the rotatable cylinder member 154 such that a rotation of the rotatable cylinder member 154 is imparted to the plurality of cultivating teeth 156. Also, as shown in the second illustrative embodiment of FIGS. 20 and 27, the garden tiller 100 further comprises a first pulley 172 operatively coupled to the electric motor 128 and a second pulley 174 operatively coupled to the impact hammer 150. In the second illustrative embodiment, the first pulley 172 is operatively coupled to the second pulley 174 by means of a tangential coupling element (i.e., a belt 168). In an alternative embodiment, first and second sprockets operatively coupled to one another by a chain could be used in place of the first and second pulleys 172, 174 and belt 168. In another alternative embodiment, first and second gears that are operatively coupled to one another could be used in place of the pulleys or sprockets.

Figure 28:
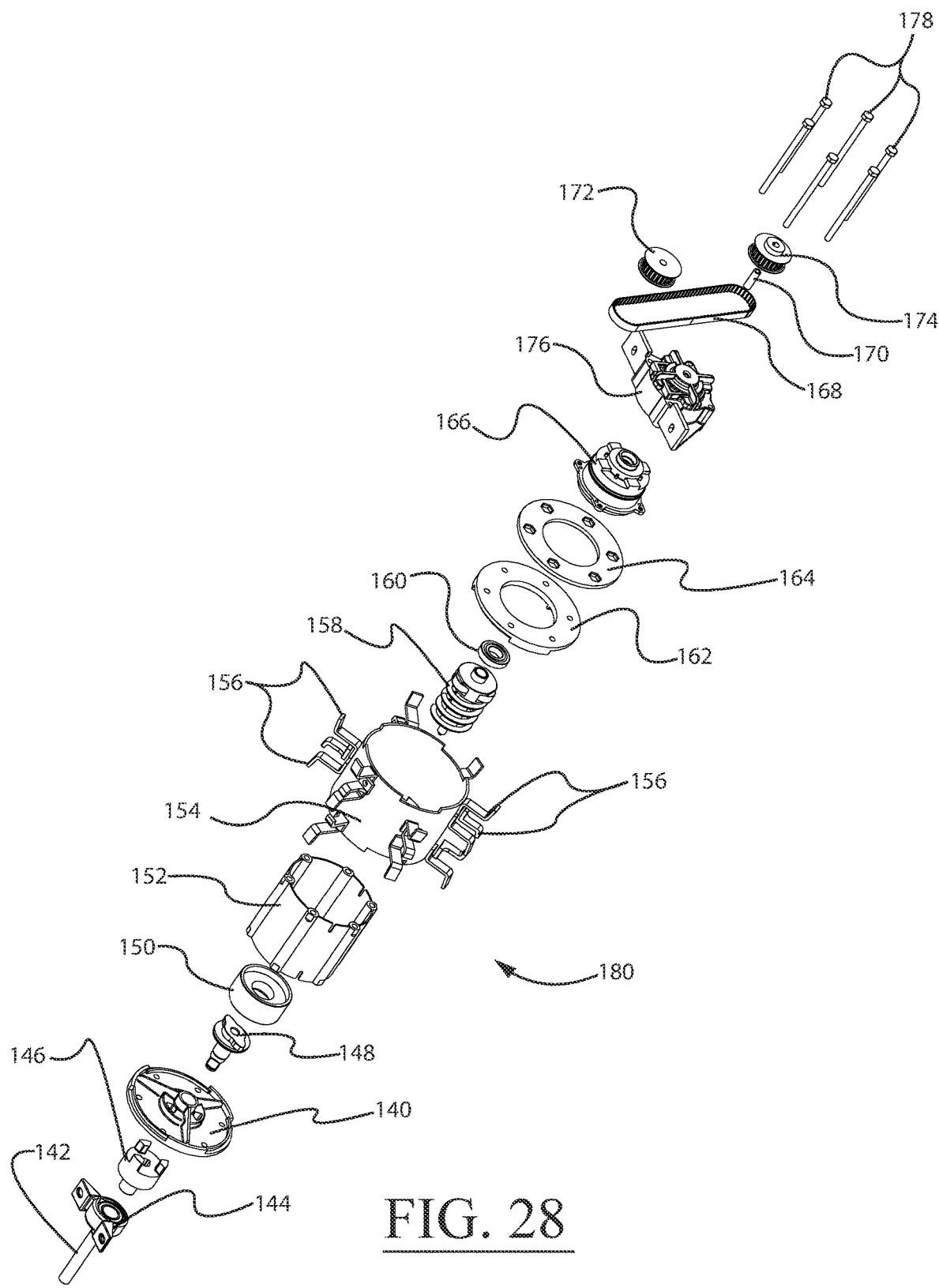
FIG. 28 is a first exploded perspective view of the impact torque assembly of the garden tiller of FIG. 20.
Figure 29:
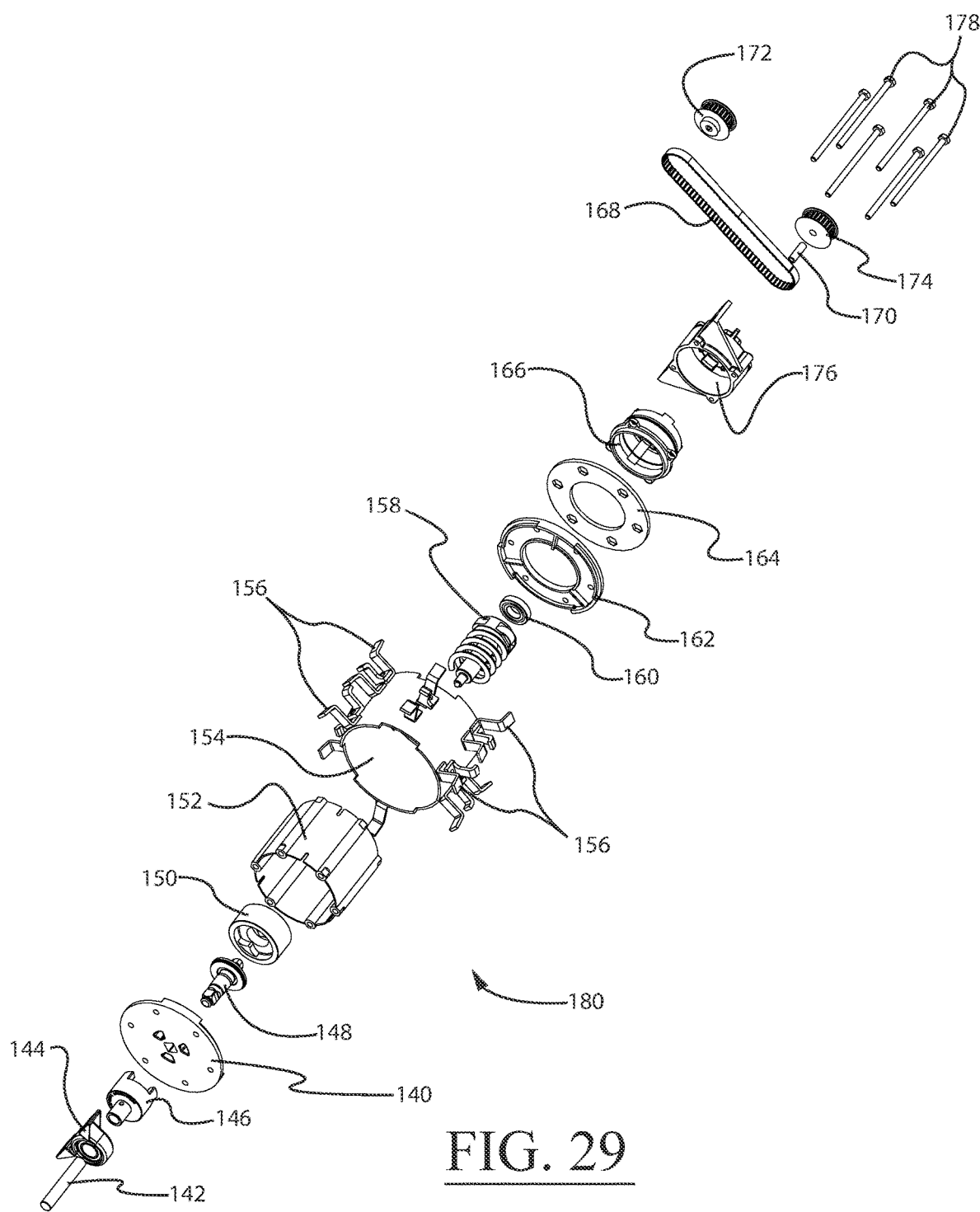
FIG. 29 is a second exploded perspective view of the impact torque assembly of the garden tiller of FIG. 20.

With combined reference to FIGS. 28, 29, and 31, the impact torque assembly 180 of the body portion of the garden tiller 100 will be explained. In the second illustrative embodiment, as best shown in FIGS. 28 and 29, the impact torque assembly 180 comprises an inner cylinder or barrel member 152 and an outer cylinder or barrel member 154. As shown in FIG. 31, the impact anvil 148, impact hammer 150, and impact gear and planetary gear subassembly 158 are disposed inside the inner cylinder member 152. The plurality of cultivating teeth 156 are attached to the outer cylinder member 154. As will be explained in further detail hereinafter, when the plurality of cultivating teeth 156 are being driven by the impact motor 128, 148, 150, the outer cylinder member 154 is configured to rotate with the inner cylinder member 152. As shown in FIG. 31, a first shaft 142 is provided on a first end of the inner and outer cylinder members 152, 154, while a second shaft 170 (i.e., a planetary gear shaft) is provided on a second, opposite end of the inner and outer cylinder members 152, 154. The first shaft 142 is rotatably supported by the bearing member 144, while the second shaft 170 is rotatably supported by the bearing member 160. Referring again to FIGS. 28 and 31, it can be seen that a motor coupling 146 is provided on the end of the cylinder members 152, 154 with the first shaft 142, while an outer bearing housing 176 and planetary gear housing 166 is provided on the end of the cylinder members 152, 154 with the second shaft 170. The bearing assemblies 144, 160, 176 of the body portion of the garden tiller 100 facilitate the mounting of the impact torque assembly 180 across the underside of the lower frame portion 108 (i.e., the impact torque assembly 180 spans across the underside of the lower frame portion 108 in a transverse direction).

Referring again to the second illustrative embodiment of FIGS. 28, 29, and 31, it can be seen that the outer cylinder member 154 of the motor assembly is provided with first and second end caps 140, 162 disposed on the opposite ends thereof such that components 148, 150 158 of the impact torque assembly 180 are enclosed, thereby protecting the components 148, 150 158 from dirt and dust when the garden tiller 100 is being used to cultivate soil. Also, as shown in the sectional view of FIG. 31, a spacer member 164 is provided between the second end cap 162 and the planetary gear housing 166. As best shown in FIGS. 28 and 29, the first and second end caps 140, 162 are secured to the inner and outer cylinder members 152, 154 by a plurality of fastener members 178 (e.g., bolts 178). In the second illustrative embodiment, the end caps 140, 162, the outer cylinder member 154, and the inner cylinder member 152 all rotate as a unit.

Figure 33A:
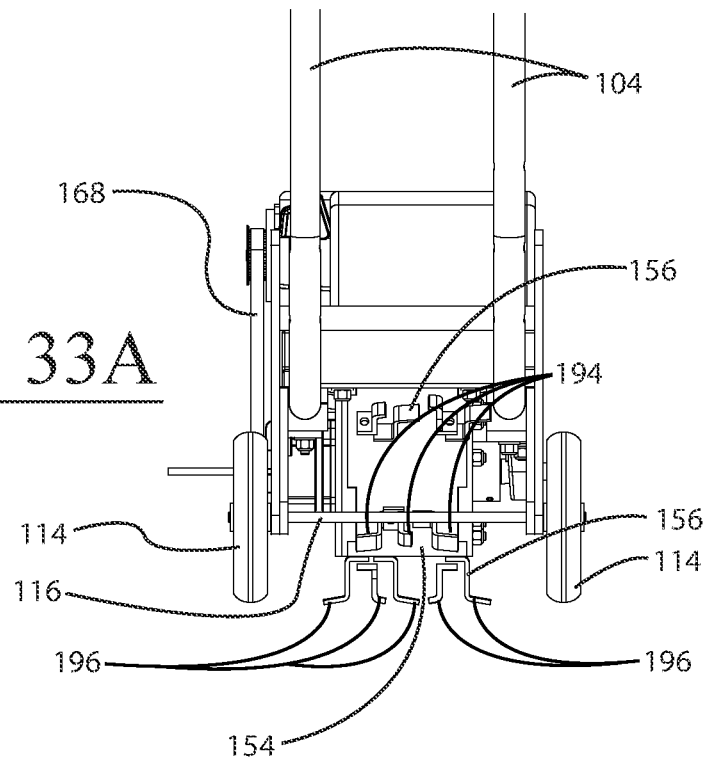
FIG. 33A is a partial rear view of the garden tiller of FIG. 20, wherein a first one of the rows of cultivating teeth is depicted in a ground contact position.
Figure 33B:
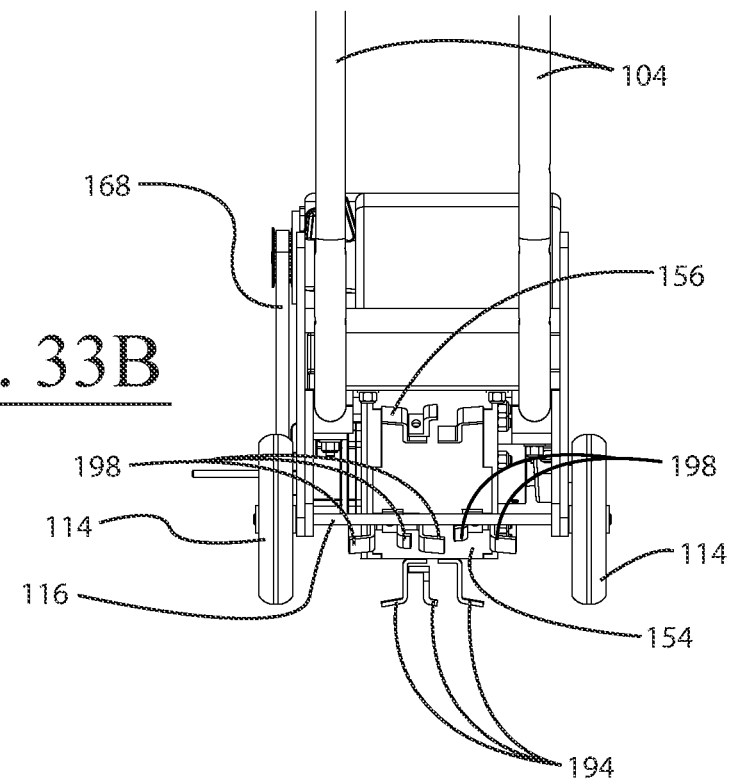
FIG. 33B is another partial rear view of the garden tiller of FIG. 20, wherein a second one of the rows of cultivating teeth is depicted in a ground contact position.

As shown in FIGS. 20, 30, 32, 33A, and 33B, in the second illustrative embodiment, the plurality of cultivating teeth 156 are arranged in a plurality of rows that are circumferentially spaced apart about a circumference of the rotatable outer cylinder member 154. Referring to FIGS. 33A and 33B, alternating rows of the cultivating teeth 156 about the circumference of the outer cylinder member 154 have different quantities of teeth so as to create a staggered arrangement of teeth (e.g., a first row 196 has five (5) teeth 156, a second row 194 has three (3) teeth 156, a third row 198 has five (5) teeth 156, etc.). That is, the teeth pattern is such that five (5) teeth 156 contact the soil, then followed by three (3) teeth 156, and then five (5) teeth 156 again, in a repeating fashion. Also, the teeth 156 in the rows point in different directions (i.e., some teeth 156 are directed inwardly toward a longitudinal centerline of the body portion, and other teeth 156 are directed outwardly away from the longitudinal centerline of the body portion). As such, the soil is impacted at different locations by the cultivating teeth 156 of the garden tiller 100 as the teeth are rotated with the outer cylinder member 154. Advantageously, the soil contact sequencing of the cultivating teeth 156 depicted in FIGS. 33A and 33B reduces the frictional resistance of the soil that is experienced by the garden tiller 100.

Now, with reference primarily to FIGS. 27-29, 31, and 32, the operational functionality of the second illustrative garden tiller 100 will be described. Referring initially to FIGS. 27 and 31, the electric motor 128 drives the first pulley 172, which in turn, is connected to a belt 168 that drives the second pulley 174, which in turn, drives a planetary gear and spring subassembly 158. When the planetary gear and spring subassembly 158 is subjected to a load that is less than that of the spring force, the planetary gear and spring subassembly 158 drives a drive shaft 142 that is connected to the end cap 140 by means of the motor coupling 146. The end cap 140 is attached to, and drives the outer cylinder member 154, which in turn, drives the cultivating teeth 156 attached to the external surface of the cylinder member 154. When the planetary gear and spring subassembly 158 is subjected to a load that is in excess of that of the spring force, the spring is engaged, which in turn, drives the impact hammer 150. The impact hammer 150 impacts the impact anvil 148 attached to the drive shaft 142 that is connected to the end cap 140. The end cap 140 is attached to, and drives the outer cylinder member 154, which in turn, drives the cultivating teeth 156 attached to the external surface of the cylinder member 154. As explained above, because the cultivating teeth 156 are affixedly attached to the external surface of the outer cylinder member 154, the rotation and torque generated by the impact motor 128, 148, 150 is imparted on the cultivating teeth 156 of the garden tiller 100 so that the soil is able to be effectively cultivated.

The exemplary torque-time graph 70 of FIG. 12 described above for the impact motor 54 of the first embodiment of the garden tiller 10 also applies to the impact motor 128, 148, 150 of the second illustrative embodiment. As shown in FIG. 12, the torque curve 76 contains a plurality of recurring peaks 78 that represent the additional impact torque delivered by the impact motor 128, 148, 150 of the garden tiller 100. As such, the impact motor 128, 148, 150 advantageously delivers a baseline torque represented by the straight line segments in FIG. 12, which is supplemented by impact torque peaks 78 that result in a much greater magnitude of torque being applied to the soil for more effectively cultivating the soil. Similar to an impact driver, the impact torque peaks 78 have a cam-hammering effect that creates a substantial spike in the garden tiller torque magnitude that may occur, for example, one-thousand times per minute or more. Advantageously, like the first embodiment described above, the impact motor 128, 148, 150 of the second illustrative embodiment also creates additional torque by means of creating a rotational impact force with a spring in planetary gear and spring subassembly 158, an impact hammer 150, and an impact anvil 148. The turning motor shaft of the impact motor 128, 148, 150 compresses the spring in the planetary gear and spring subassembly 158 that is then released, which then drives the impact hammer 150 against the impact anvil 148 so as to create the additional torque spikes.

Figure 34:
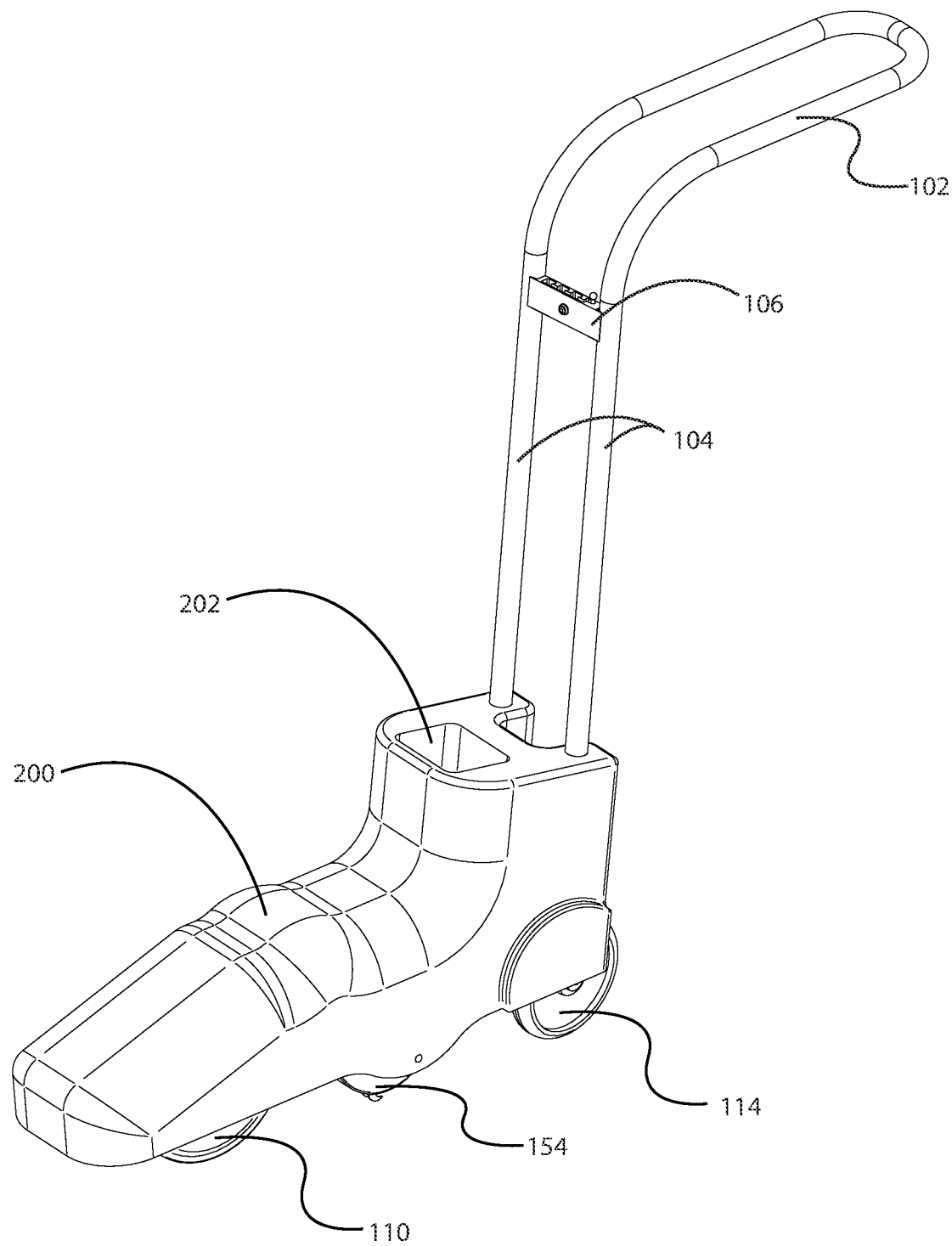
FIG. 34 is another overall perspective view of the garden tiller of FIG. 20, wherein the body portion of the garden tiller is depicted with an enclosure or housing disposed thereon.
Figure 35:
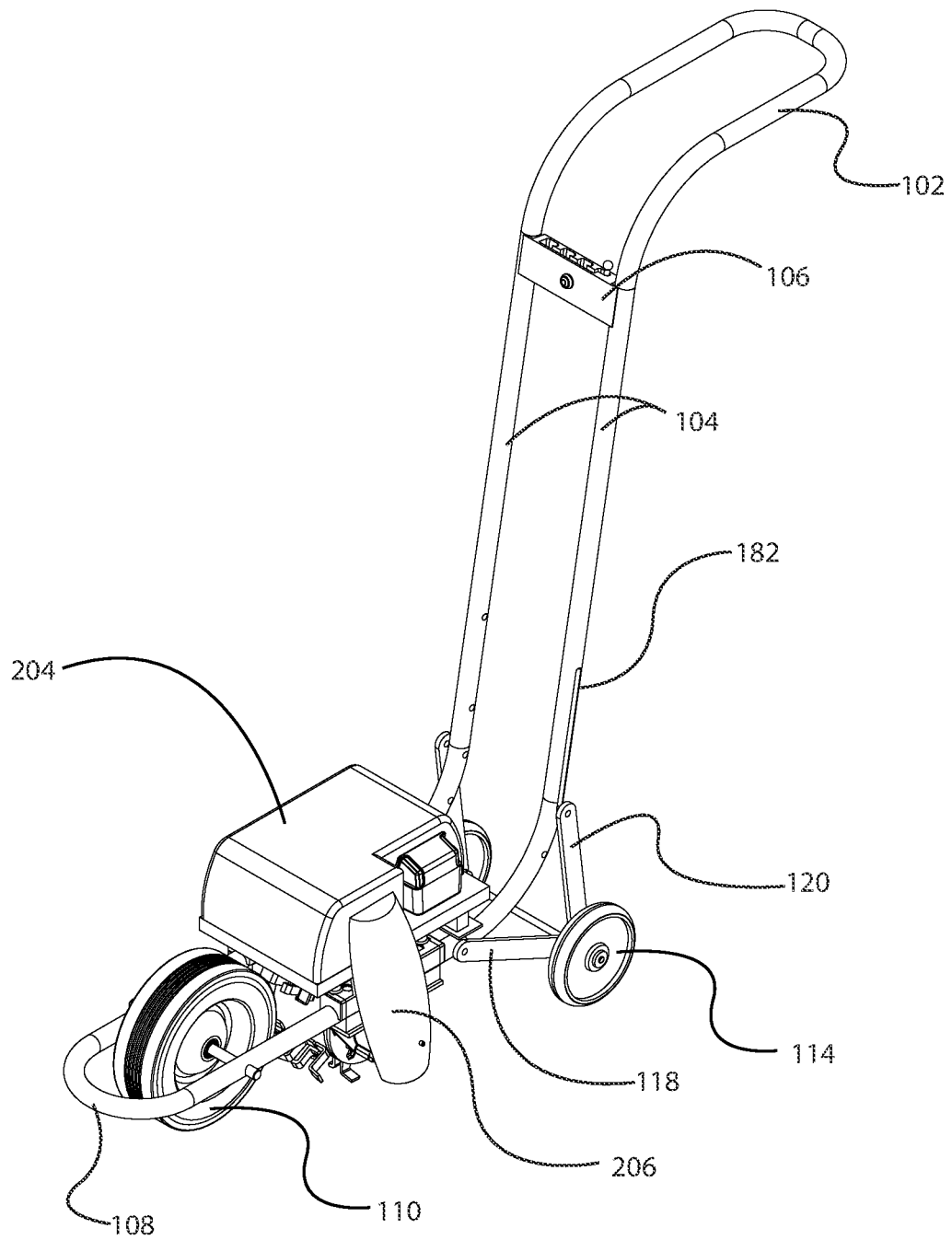
FIG. 35 is still another overall perspective view of the garden tiller of FIG. 20, wherein an enclosure or housing is depicted on the motor and battery pack of the body portion, and a belt guard is disposed over the belt of the impact motor.

As shown in FIG. 34, in the second illustrative embodiment, the body portion of garden tiller 100 may be provided with a plastic enclosure or housing 200 disposed thereon, thereby enhancing user safety and the aesthetic appearance of the garden tiller 100. The plastic enclosure or housing 200 may have a battery pack slot 202 disposed therein for gaining access to the battery pack 124. Alternatively, as depicted in FIG. 35, a smaller plastic cover 204 may be provided over the electric motor 128 and battery pack 124, and a plastic belt guard 206 may be provided over the belt 168 in order to protect the user from injury resulting from the rotating belt 168.

It is readily apparent that the aforedescribed garden tiller 10, 100 offers numerous advantages and benefits. First, the garden tiller 10, 100 is able to effectively cultivate both normal and heavily compacted, clay-rich soils. Secondly, the garden tiller 10, 100 minimizes the frictional drag of cutting through the soil, while still moving soil back and up and out of the area of active digging. Finally, the garden tiller 10, 100 is lightweight enough to be effectively used by the home gardener, particularly a home gardener with diminished strength and/or endurance. The garden tiller 100 does not pull and/or buckle like a conventional rototiller, and thus, is particularly beneficial for an older person with diminished strength and/or endurance because the garden tiller 100 does not result in a loss of the user's balance.

Advantageously, the garden tiller 10, 100 described herein has a very unique design and approach to cultivating. In addition to being lightweight and battery-powered, it has a unique ability to cultivate both normal and heavily compacted, clay-rich soils. As such, the garden tiller 10, 100 is an ideal tool for the home gardener, particularly those with diminished strength and/or endurance. As explained above, the impact motor 54, 128, 148, 150 in the garden tiller 10, 100 maximizes torque for cultivating heavily compacted and clay-filled soils. Also, internalizing the impact driver/motor 54, 128, 148, 150 into the axis of the cultivator reduces weight, but also places the weight where it maximally assists cultivating. The internal impact motor 54, 128, 148, 150 streamlines the cultivating end of the tool, thereby permitting greater penetration into the ground. In addition, the cultivating teeth 68, 156 are unique and designed to minimize the frictional drag of cutting through soil, while still moving the soil back and up, and out of the area of active digging.

Any of the features or attributes of the above described embodiments and variations can be used in combination with any of the other features and attributes of the above described embodiments and variations as desired.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A garden tiller, comprising:
    at least one handle portion configured to be grasped by a user;
    a shaft portion coupled to the at least one handle portion, the shaft portion having a first end and a second end, the second end of the shaft portion being oppositely disposed relative to the first end; and
    a body portion coupled to the second end of the shaft portion, the body portion including an impact motor configured to drive one or more cultivating teeth for loosening and/or displacing soil, the impact motor of the body portion comprising an impact hammer and anvil disposed within a rotatable cylinder member, the impact hammer and anvil being operatively coupled to the rotatable cylinder member, the one or more cultivating teeth being attached to the rotatable cylinder member such that rotation of the rotatable cylinder member is imparted to the one or more cultivating teeth, and the impact motor configured to apply an impact torque to the one or more cultivating teeth through the rotatable cylinder member so as to more effectively break up compacted soil.

2. The garden tiller according to claim 1, wherein the at least one handle portion comprises an upper handle portion attached to the first end of the shaft portion, and a lower handle portion attached to the shaft portion between the first and second ends of the shaft portion.

3. The garden tiller according to claim 1, wherein the shaft portion comprises a telescopic inner shaft disposed within an external outer shaft so that a length of the shaft portion is able to be adjusted.

4. The garden tiller according to claim 1, wherein the impact motor further comprises an electric motor, and wherein the garden tiller further comprises a battery power source for powering the electric motor.

5. The garden tiller according to claim 1, wherein the body portion further comprises a shield member for preventing the loosened and/or displaced soil from being thrown backwards toward the user.

6. The garden tiller according to claim 5, wherein the body portion further comprises a trough device adjustably attached to the shield member, the trough device adjustable to different heights for creating trenches of varying depths in the loosened and/or displaced soil.

7. The garden tiller according to claim 1, wherein the rotatable cylinder member is in a form of a rotatable outer cylinder member, and the body portion further comprises an inner cylinder member, the one or more cultivating teeth being attached to the rotatable outer cylinder member, and the rotatable outer cylinder member being configured to rotate relative to the inner cylinder member when the one or more cultivating teeth are being driven by the impact motor.

8. The garden tiller according to claim 7, wherein the one or more cultivating teeth of the body portion comprise a plurality of teeth disposed on at least one ring member attached to the outer cylinder member, the plurality of teeth being circumferentially spaced apart about the at least one ring member.

9. The garden tiller according to claim 8, wherein the at least one ring member comprises a plurality of ring members axially spaced apart from one another along a length of the outer cylinder member, each of the plurality of ring members having a plurality of circumferentially spaced-apart teeth, and at least some of the teeth on adjacent ring members being circumferentially staggered relative to one another so as to contact the soil at varying heights.

10. The garden tiller according to claim 1, wherein at least one of the one or more cultivating teeth has a tapered body portion with a sharp tip to facilitate the breaking up of the compacted soil.

11. The garden tiller according to claim 1, wherein the one or more cultivating teeth of the body portion comprise a plurality of cultivating teeth for loosening and/or displacing soil, and wherein the impact motor is configured to apply a baseline torque and an additional impact torque to the plurality of cultivating teeth so as to more effectively break up compacted soil.

12. The garden tiller according to claim 1, wherein the body portion further comprises a plurality of wheels for enabling the garden tiller to be rolled along the ground.

13. The garden tiller according to claim 1, further comprising a height adjustment mechanism, the height adjustment mechanism enabling the garden tiller to be adjustable to different heights for varying a soil cultivating depth.

14. The garden tiller according to claim 1, wherein the impact motor further comprises an electric motor remotely located from the impact hammer and anvil.

15. The garden tiller according to claim 14, further comprising a first pulley or first sprocket operatively coupled to the electric motor and a second pulley or second sprocket operatively coupled to the impact hammer, the first pulley or first sprocket being operatively coupled to the second pulley or second sprocket by means of a tangential coupling element.

16. The garden tiller according to claim 15, wherein the tangential coupling element is selected from a group consisting of a belt and a chain.

17. The garden tiller according to claim 14, wherein the one or more cultivating teeth of the body portion comprise a plurality of rows of teeth circumferentially spaced apart about a circumference of the rotatable cylinder member, and at least two of the plurality of rows of teeth have different quantities of teeth so as to create a staggered arrangement of teeth.

18. The garden tiller according to claim 17, wherein at least one tooth in the plurality of rows of teeth is directed inwardly toward a longitudinal centerline of the body portion, and at least another tooth in the plurality of rows of teeth is directed outwardly away from the longitudinal centerline of the body portion.

* * * * *